United States Patent [19]

Bernier et al.

[11] 4,215,412

[45] Jul. 29, 1980

[54] REAL TIME PERFORMANCE MONITORING OF GAS TURBINE ENGINES

[75] Inventors: Joseph L. Bernier, Issaquah, Wash.; Peter W. Kamber, Hawi, Hi.

[73] Assignee: The Boeing Company, Seattle, Wash.

[21] Appl. No.: 923,950

[22] Filed: Jul. 13, 1978

[51] Int. Cl.[2] .......................... G06F 15/20; G06F 15/32

[52] U.S. Cl. .................................... 364/551; 364/431; 73/116

[58] Field of Search ............... 364/551, 572, 578, 431, 364/119, 111, 116, 105, 121; 73/116; 318/563-565, 580

[56] References Cited

U.S. PATENT DOCUMENTS

| | | | |
|---|---|---|---|
| 3,238,768 | 3/1966 | Richardson | 364/551 |
| 3,601,588 | 8/1971 | Bristol | 364/116 X |
| 3,731,070 | 5/1973 | Urban | 364/551 |
| 4,032,757 | 6/1977 | Eccles | 364/119 X |
| 4,115,847 | 9/1978 | Osder et al. | 364/119 X |
| 4,128,005 | 12/1978 | Arnston et al. | 364/431 X |

*Primary Examiner*—Edward J. Wise
*Attorney, Agent, or Firm*—Christensen, O'Connor, Johnson & Kindness

[57] ABSTRACT

A real-time gas turbine engine monitoring system is disclosed which includes a digital processor that utilizes a set of scalar coefficients and the current value of various engine operating parameters to predict the current value of a set of engine performance parameters. The actual values of these performance parameters are monitored and compared with the predicted values to supply deviation or error signals to monitoring logic which provides an indication of faults within the digital processor, within the sensor units which provide the actual values of the monitored performance parameters and within the gas turbine engine. In addition, the deviation signals are utilized within the digital processor unit to determine a time dependent quadratic estimate of the temporal characteristics of each monitored engine parameter. Signals representative of this quadratic estimate are supplied to trending logic that provides prognostic information. To adapt the disclosed engine monitoring system to the particular engine being monitored, the system is operable in a calibration mode wherein digital filtering is utilized to automatically determine coefficient values which reflect normal differences in performance between the monitored engine and others of the same type. Since similar digital filtering is utilized in the determination of the temporal characteristics of the monitored engine parameters, common digital processor structure and processing is utilized to effect both system calibration and the estimate of the parameter trends or temporal characteristics.

16 Claims, 9 Drawing Figures

Fig. 3A.
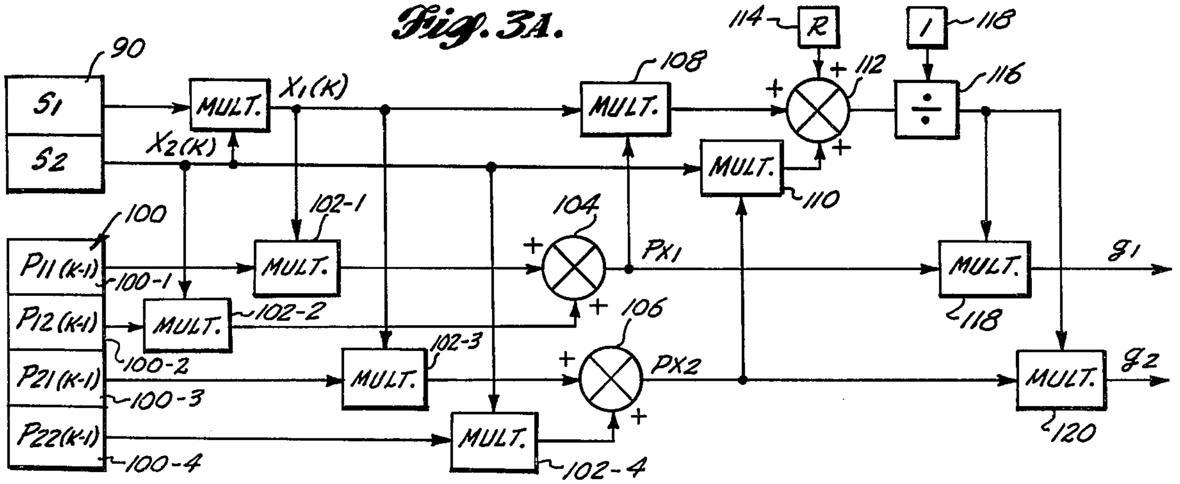
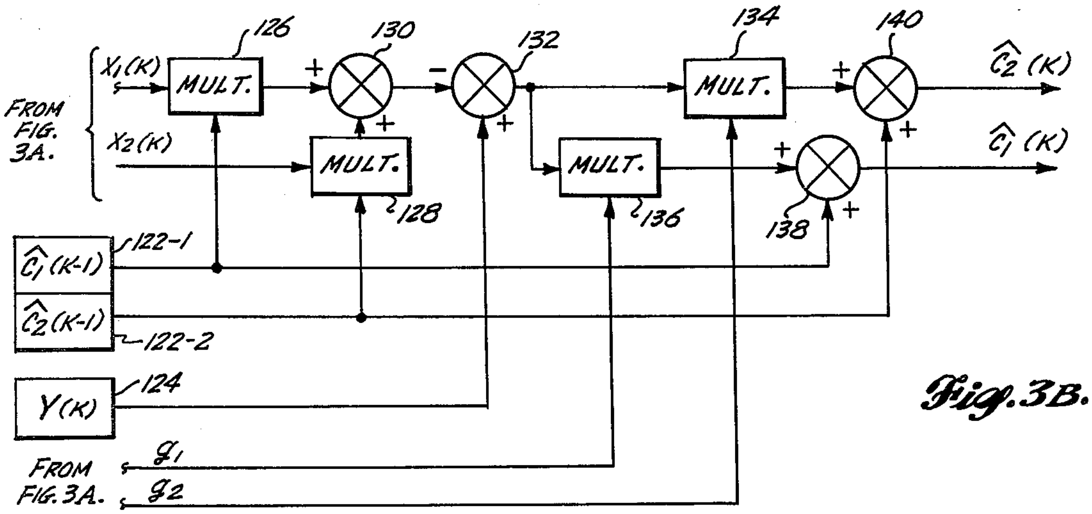
Fig. 3B.
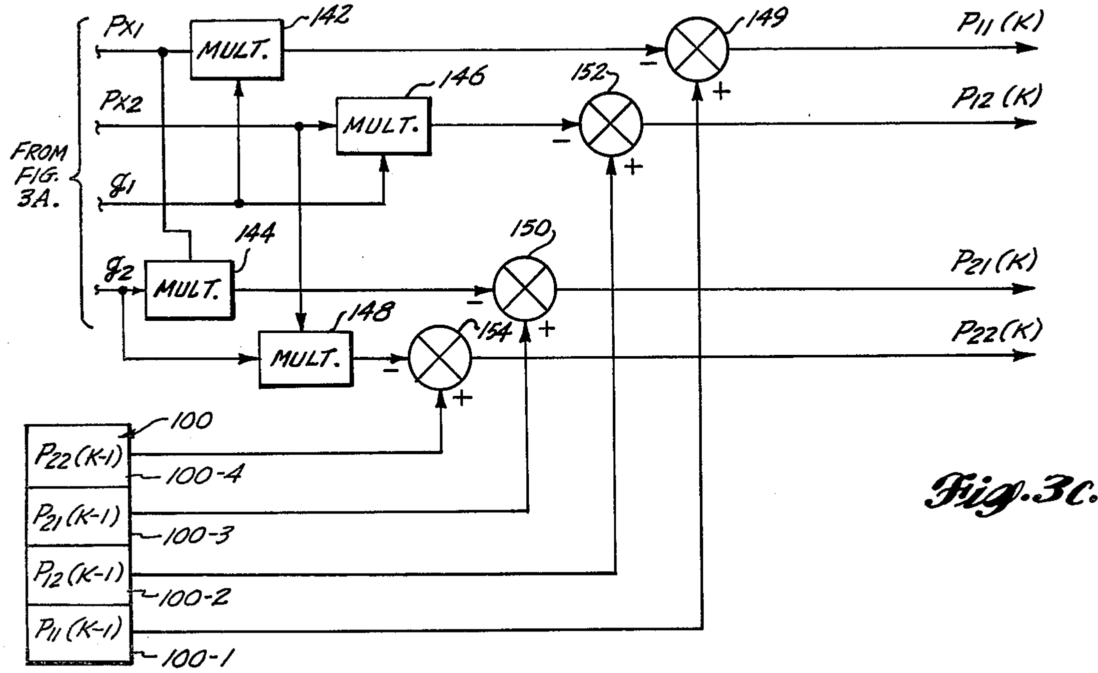
Fig. 3C.

REAL TIME PERFORMANCE MONITORING OF GAS TURBINE ENGINES

BACKGROUND OF THE INVENTION

This invention relates to a system for analyzing the performance of a gas turbine engine. More particularly, this invention relates to a system for monitoring a gas turbine engine wherein various engine performance parameters are sensed and compared with predicted values of the same parameters to supply deviation or error signals indicative of the condition of the engine.

In the gas turbine engine arts, the need for apparatus and methods for monitoring the performance of a gas turbine engine to provide diagnostic information such as the detection of an engine fault and provide prognostic information such as the time the engine can be operated until maintenance procedures are required has long been recognized. The need for such apparatus and techniques is especially apparent with respect to gas turbine engines which power aircraft since the failure of these engines often causes delayed departures and maintenance problems which are not only costly to the aircraft operator, but, in the case of commercial transport aircraft, cause inconvenience and potential economic loss to passengers and the shippers of freight. Further, the present practice of overhauling aircraft gas turbine engines after an empirical period of operation is not cost effective in that, although such practice tends to minimize the probability of inservice engine failure, many engines are prematurely removed from service for maintenance or overhaul. In addition, it has been recognized that a gas turbine monitoring system which provides an immediate indication of engine malfunction or of impending failure will allow an aircraft crew to take immediate action which can minimize damage to the engine and further enhance aircraft safety margins.

Accordingly, a variety of systems have been proposed to monitor and analyze the operation of a gas turbine engine in a manner which detects engine malfunction or failure and/or provides diagnostic or prognostic information that is of value in engine maintenance and overhaul operations. Basically, these prior art monitoring systems can be classified as either ground based systems which utilize engine data gathered during previous flights of the aircraft or as airborne systems which either continuously or periodically sense various engine performance parameters.

Generally, the ground based systems include equipment on the aircraft to periodically record the values of various engine performance parameters during periods of aircraft operation in which the monitored engine is operated under predetermined conditions and include a ground based monitoring station which generally utilizes a large scale digital computer. In the operation of such a system, recorded engine performance data is either transmitted to the ground based monitoring station or, more typically, stored on magnetic tape or other media within the aircraft for delivery to the ground station at a later convenient time. Once the engine data is received at the ground station, it is generally "conditioned" by filtering techniques to remove a substantial portion of the noise content and to normalize the data so that it is amenable to processing within the particular computer and analysis routine that is employed. After such conditioning and normalization, the data is stored within a data bank for later computer processing. Generally, this processing is performed on a periodic basis to determine the temporal or trend characteristics of the monitored engine parameters, which trend information is useful in supplementing periodical overhaul policies to prevent premature removal of an engine. Additionally, when an engine fails in service, the previously recorded engine performance data can be processed within the computer to aid in determining the cause of engine failure and hence ensure that adequate overhaul procedures are followed before the engine is returned to service.

Although such ground based engine monitoring systems have both diagnostic and prognostic capabilities, several disadvantages and drawbacks are presented. First, and foremost, the analysis of gas turbine engine performance is not effected as the engine operates (i.e., in "real time" or "on-line") but, because of delays encountered in recording the engine data, transmitting it to the ground station and analyzing the data within the computer, the diagnostic and prognostic capabilities of the system are limited. For example, such "after-the-fact" analysis may not be readily available when an engine must be removed and quickly restored to service. Further, such after-the-fact analysis does not provide the flight crew with current engine performance data and in-flight procedures which could prevent serious engine damage cannot be initiated. In addition, although such a ground based station can serve a number of aircraft, the costs associated with operating such a system are relatively high both in terms of the required investment in equipment and the labor costs involved in operating and maintaining such a system.

Previously proposed gas turbine engine monitoring systems that are operable in an airborne application are typified by U.S. Pat. No. 3,238,768, which issued to D. V. Richardson on March 8, 1966 and U.S. Pat. No. 3,731,070, which issued to Lewis A. Urban on May 1, 1973. Both of these systems are based on the concept that the thermodynamic processes occurring within a gas turbine engine can at least be approximated by one or more functions of various engine performance parameters. In this respect, the systems disclosed by these references can be said to incorporate system modeling techniques or electronic simulation.

For example, in the system disclosed by Richardson, the engine pressure ratio (EPR) of a twin spool gas turbine engine is monitored and, in the mathematical sense, is treated as an independent variable that is used to determine values of fuel flow (W), exhaust gas temperature (EGT) and the rotational speed of the high pressure compressor stage (N2) which would result in a properly operating theoretical or ideal engine of the type being monitored. More specifically, in this arrangement, pressure sensors are utilized to determine the pressure at the inlet of the high pressure compressor stage (P2) and the pressure at the inlet of the engine exhaust nozzle (P7). The ratio of the signals supplied by these sensors (P7/P2) is equal to the EPR and is supplied to three diode networks that are arranged to effect voltage transfer characteristics that closely approximate the parametric relationship between the independent variable (EPR) and one of the associated dependent variables (W, EGT, and N2) in an "ideal" engine of the type being monitored. Thus, the signals supplied by the diode networks are intended to represent expected values of W, EGT, and N2 that would result if the engine being monitored exactly corresponds to such a "ideal" engine, and if the monitored engine is operating properly. To detect that the monitored engine is not performing as expected, the signals supplied by the diode networks and signals representative of the actual value of the engine parameters (W, EGT and N2) are supplied to analog computational networks which calculate the deviation between the expected and actual value of each of these parameters.

In monitoring systems of the type disclosed in the previously referenced patent to Urban, sensors detect the values of various engine performance parameters, and reference or base line information that represents the parametric relationship between a number of engine performance parameters which are utilized as dependent variables and an engine performance parameter such as EPR is stored within the memory of a special purpose computer when the system is first installed. During operation of this system, the difference between the actual value of each sensed performance parameter (dependent variable) and the corresponding stored information is determined by the computer to supply a set of parameter deviation signals. The set of deviation signals is then utilized in the computer along with a stored set of coefficients to compute deviations in a set of independent engine performance parameters whose values ideally vary only with degradation in engine performance. The values of coefficients utilized are dictated by the type of engine being monitored and are the coefficents of a set of linear differential equations which characterize the interrelationship between changes in the monitored engine performance parameters (dependent variables) and changes in the engine performance parameters which constitute the associated independent variables.

When the system computer determines that a deviation has occurred in one or more of the calculated independent variables, signals representative of these deviations are logically combined to activate fault indicators that indicate which engine components should be inspected to locate the fault. Additionally, in the system disclosed by the Urban patent, the computed deviations in the independent variables are plotted as a function of time for comparison with predetermined limits to prognosticate the future operating condition of the monitored gas turbine engine.

Various disadvantages and drawbacks are encountered with prior art airborne gas turbine engine monitoring systems of the above described types. For example, neither of these systems is capable of precisely monitoring engine performance over the entire operating regime of the engine being monitored. In this respect, since the base line information that is gathered and stored in the type of system disclosed by the Urban patent necessarily reflects a single engine operating condition (e.g., static sea level operation), and since in actual practice, the values of engine performance parameters do not remain constant under other operating conditions (e.g., operation of the aircraft at other altitudes and speeds), such a system would appear to be inherently limited to utilization with the monitored engine being operated under conditions which correspond to those conditions under which the base line information was recorded. Alternatively, if such a system is utilized under other engine operating conditions, compromises in system accuracy must be accepted. Similarly, since a system of the type disclosed by the Richardson patent depends on preascertained relationships to characterize the performance of a theoretical nominal engine of the type being monitored, it would appear that such a system cannot compensate for, or accomodate, natural variations in engine performance parameters that arise under various engine operating conditions. Further, even though gas turbine engines are manufactured and refurbished in accordance with strict dimensional tolerances, the actual performance parameters of engines within a particular type deviate from theoretical or nominal values by an amount that is significant with respect to the accuracy requirements of a monitoring system which will detect minute changes in engine performance parameters to thereby indicate engine deterioration before serious engine failure occurs. Thus, most prior art gas turbine engine monitoring systems which rely on a theoretical engine model are inherently limited in monitoring accuracy. Systems such as those disclosed by the Urban patent at least partially overcome this limitation by utilizing previously recorded data that is obtained from the engine being monitored as the engine monitoring reference or base line. However, attaining a high degree of accuracy in such a system not only requires that the differential equations which model or simulate the thermodynamic characteristics of the type of engine being monitored precisely describe such thermodynamic characteristics, but also requires that each engine of a particular type exhibit exactly the same characteristics. Since structural variations do occur because of manufacturing and installation tolerances and since gradual deterioration in performance occurs throughout an engine's operating life, the constant coefficient modeling approach utilized in the system disclosed by the Urban patent cannot provide the degree of accuracy that is necessary or desired in exacting engine monitoring applications.

In addition, neither type of the previously described prior art systems addresses the problem of sensor inaccuracies or signal noise which is commonly encountered with commercially available pressure and temperature sensors. In this respect, in a system such as that disclosed in the Urban patent, wherein system accuracy depends on the validity of recorded base line data, precisely defining the base line information would generally require several measurements at each operating point to obtain a statistically valid mean value. This procedure would generally require a fairly sophisticated digital computer having a nonvolatile memory that is capable of storing the large amount of collected data throughout the operational life of the monitored engine. Since such computers are not only economically unattractive for airborne engine monitoring applications, but also increase the weight and structural complexity of the monitoring system, a highly accurate system of the type disclosed in the Urban patent may not be practical or desirable.

Accordingly, it is an object of this invention to provide a highly accurate system for real-time monitoring of the performance parameters of a gas turbine engine wherein system accuracy is not substantially affected by normal variations associated with engine manufacturing, installation tolerances and/or normal engine deterioration.

It is another object of this invention to provide a system for monitoring the performance parameters of a gas turbine engine in which the system is accurate over a wide range of engine operating conditions.

It is yet another object of this invention to provide a system for monitoring the performance parameters of a gas turbine engine wherein noise and inaccuracies associated with the system sensors have minimal effect on the system accuracy and reliability.

Still further, it is an object of this invention to provide a performance monitoring system of the above-described type which exhibits a degree of structural and computational simplicity that is necessary and desirable for real-time airborne monitoring applications.

SUMMARY OF THE INVENTION

These and other objects are achieved in accordance with this invention by a gas turbine performance monitoring system wherein the system is arranged to employ engine modeling techniques that reflect operation of the monitored engine over a desired operating range (e.g., the full operational range of the engine) and wherein the system is operable in an in-flight calibration mode in which the system model is automatically adapted to the particular engine being monitored.

In each embodiment of the invention, system sensors detect the current value of engine operating data, including various engine performance parameters, air data signals and/or engine control signals, and supply signals representative of this data to a digital processor unit that utilizes these signals (and certain functions thereof) in predicting current values of one or more engine parameters that are indicative of deterioration in engine performance. For purposes of descriptive clarity, the predicted engine performance parameters are referred to hereinafter as dependent performance parameters or variables and the engine operating data (or signals representative thereof) that are utilized in the prediction of these dependent performance parameters are hereinafter referred to as independent performance parameters or variables; such terminology being with reference to the parametric interrelationship between these parameters within the mathematical description of the electronic simulation or modeling that is utilized in the practice of this invention.

More specifically, in accordance with this invention, the electronic simulation or modeling that is achieved by the digital processor can be represented mathematically by the matrix equation:

$$Y=CX+E,$$

where Y is a column vector comprising the predicted dependent engine performance parameters, X is a column vector comprising the independent performance parameters, C is a matrix of scalar coefficients, and E is a column vector comprising scalar elements which represent modeling inaccuracies. For example, in an embodiment of the invention wherein n dependent engine performance variables are estimated and m independent performance variables are utilized in the electronic simulation of each dependent performance variable, Y and E are column vectors each having n elements, X is a column vector having m elements and the coefficient matrix C includes m elements in each row and n elements in each column. Thus, it can be recognized that, in accordance with the electronic simulation or modeling that is utilized in this invention, each dependent engine parameter $y_k$, $k=1, 2, \ldots, n$ is mathematically equivalent to $$\sum_{i=1}^{m} c_{k,i}x_i + e_k$$

where y, x, e, and c are the scalar values of the corresponding elements in the vectors Y, X, E and the coefficient matrix C.

In accordance with this invention, such electronic simulation or modeling does not rely only on those sets of dependent and independent engine parameters which, through appropriate coefficients, are known in the art to parametrically describe the steady state thermodynamic gas generator characteristics of the type of engine being monitored. Rather, in accordance with this invention, the independent engine parameters $x_i$, $i=1, 2, \ldots, m$ are preferably selected from easily monitored engine data such as various engine performance parameters, air data signals and engine command signals through statistical analysis of data which reflects performance of an engine of the type to be monitored. In particular, in accordance with this invention, a set of independent engine parameters ($x_i$) for estimating the values of a set of desired dependent engine parameters is determined from engine performance data of the particular type of engine to be monitored (e.g., a Pratt-Whitney JT8 or JT9 type engine, or even more generally, any high bypass, twin spool gas turbine engine), by linear regression analysis of such engine performance data. It has been found that, when the independent engine parameters are selected in this manner, such parameters are generic to, and uniquely characterize, the type of engine being monitored whereas the coefficients (c) distinguish a particular engine being monitored from others of the same type to thereby account for normal engine manufacturing and installation tolerances. Further, since the data utilized to determine the independent engine parameters can reflect engine performance over any desired range of steady state engine operating conditions (e.g., flight at various Mach numbers, altitudes, throttle positions and ambient air temperature), the selected set of independent engine parameters provides valid and accurate prediction of the dependent engine parameters over a corresponding range of operating conditions. Accordingly, in the practice of this invention, system accuracy is maintained over a wide range of engine operating conditions which can include the entire range of steady state operating conditions that are encountered in the normal operation of the aircraft which utilizes the monitored engine.

To automatically adapt a monitoring system of this invention to the particular engine being monitored the system is operable in an in-flight calibration mode wherein digital signal filtering is employed to determine values of the coefficients c that are appropriate to the particular engine being monitored. These coefficients are stored within memory registers and utilized until the engine being monitored is replaced or the monitoring system or engine is otherwise modified in a manner which requires new coefficient values in order to restore and maintain the desired system accuracy. More specifically, in each disclosed embodiment of the invention, recursive digital filtering of the type commonly identified as Kalman filtering is implemented within the digital processor to provide the desired coefficients. In this digital filtering arrangement, the digital processor estimates the current value of each monitored dependent engine parameter based on current values of the coefficients c and the current values of the independent engine parameters x; determines the error between the estimated and actual values of the monitored dependent engine parameters y; and, updates the values of each stored coefficient c such that the estimation error decreases. By sequentially operating in this manner, the data processor continues to refine the values of the above-described coefficients until a desired prediction accuracy is achieved. Further, since the calibration mode can be effected in flight with the monitored engine being operated under normal flight conditions, the final coefficient values are not related to either a hypothetical nominal engine and/or to an engine operating state that does not represent actual flight conditions.

In accordance with the invention, signals representative of the estimated value of each dependent engine performance parameter are supplied to a difference unit which can be realized within the digital processor unit or by other conventional electronic circuitry. Within the difference unit, the signals are compared with signals representative of the actual current value of each of the dependent engine parameters (provided by a set of sensors mounted to or within the engine being monitored), to supply deviation signals that represent the difference between the estimated and actual values of each dependent performance parameter. These deviation signals are coupled to monitoring logic which combines the signals to detect a fault within the digital processor, the system sensors, or the gas turbine engine.

Additionally, to detect deterioration in engine performance that is attributable to normal engine wear or precipitated by abnormal operating conditions, the deviation signals are utilized within the digital processor to supply signals which estimate the temporal characteristics or trends associated with any or all of the monitored dependent engine performance parameters. This trend information is of considerable prognostic value to the flight crew and to maintenance personnel in that such information allows estimation of the time at which the monitored engine will require overhaul, maintenance activity, or procedural changes relative to the manner in which the engine is operated. Thus, such information can complement or even supplant the conventional procedure of removing an engine for maintenance or overhaul after an empirically determined period of operation or after the occurance of a malfunction. Further, the trend signals provided in accordance with this invention are indicative of the rate at which deterioration in engine performance is occurring. Thus, a prediction of imminent engine malfunction resulting from causes other than normal performance deterioation can be provided.

In accordance with this invention, the trend signals are supplied by augmenting the electronic simulation or modeling arrangement of the data processor to include time dependent terms that are capable of characterizing the time varying drift in the values of critical engine performance parameters, i.e., the monitored dependent engine parameters, which evidence changes in engine performance that are attributable to sources such as normal engine wear. In particular, in an embodiment of the invention which includes performance trending capability, operation of the electronic simulation or modeling of each dependent engine parameter can be represented by the mathematical expression $$y = \sum_{i=1}^{m} c_i x_i + \sum_{q=0}^{r} b_q t^q + e$$

where t is the length of time that the system has been monitoring that particular engine, r defines the order of the polynomial estimate being utilized to describe the time-dependent nature of the dependent variable y, and each coefficient $b_0, b_1, \ldots, b_q$ is a scalar quantity.

In the disclosed embodiments of the invention, recursive digital filtering is employed to supply signals representative of the trend coefficients $b_0, b_1, \ldots, b_q$ that are associated with each monitored dependent engine performance parameter every time the digital processor unit monitors the value of that particular engine parameter. In particular, Kalman filtering or estimation is utilized wherein the data processor uses the previously mentioned deviation signal (difference between the actual and estimated value of the dependent engine parameter) to determine the current values of the trend coefficients. Thus, in accordance with this invention, current values of the trend coefficients reflect changes that occur in the monitored dependent engine parameters over the entire period in which the system is interconnected with the monitored engine installation. Accordingly, the trend coefficients are capable of characterizing relatively subtle (i.e., very slow) changes in engine performance.

The signals which represent each of the trend coefficients are supplied to trend logic which utilizes combinatorial logic to provide an indication of prognostic information such as the estimated number of hours the engine can be operated prior to overhaul, go/no-go dispatchability of the aircraft and in-flight warning of a predicted imminent engine malfunction.

Like most systems which incorporate sequential digital operations and combinatorial logic, the monitoring system of this invention can be structured in a variety of manners. For example, in embodiments wherein relatively few engine performance parameters need be monitored and the monitored dependent parameters can be characterized by relatively few independent engine parameters, an embodiment of this invention can utilize hard-wired arrangements of commercially available digital integrated circuits or discrete circuit components. On the other hand, in embodiments in which several dependent engine variables are to be monitored and/or several independent engine parameters are required to achieve the desired system accuracy, a programmable computer is advantageously employed to implement at least the digital filtering and performance parameter modeling. As shall become apparent upon attaining a more complete understanding of the invention, computers suitable for use in such embodiments not only include conventional airborne computers of the type that are programmed by conventional software techniques, but also include relatively small and simple computing devices such as those conventional integrated circuits commonly called microprocessors. As is known in the art, such microprocessor arrangements can be programmed by software techniques, hardwire connections, stored information such as read-only memory units (i.e., "firm-ware"), and by various combinations thereof.

BRIEF DESCRIPTION OF THE DRAWINGS

Other objects and advantages of the present invention will be apparent to one skilled in the art after a reading of the following description taken together with the accompanying drawing in which:

FIG. 3 (consisting of FIGS. 3A–3C) is a block diagram which is useful in understanding the digital signal filtering utilized in the practice of this invention and illustrates one manner of embodying the coefficient estimator depicted in FIG. 1;

DETAILED DESCRIPTION

Figure 1:
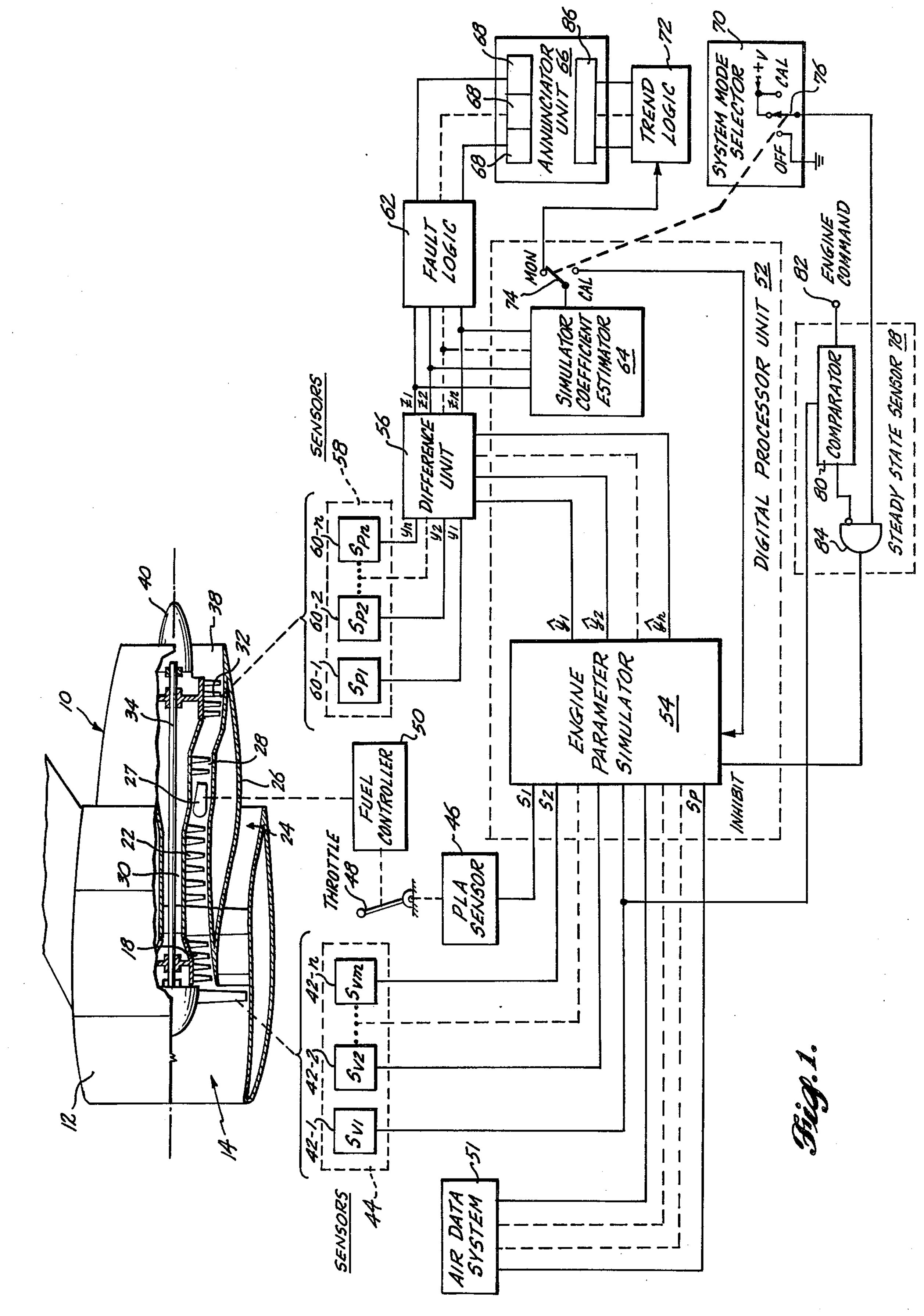
FIG. 1 is a block diagram of a gas turbine engine performance monitoring system constructed in accordance with this invention.

FIG. 1 depicts a monitoring system of this invention arranged for monitoring the performance of a gas turbine engine of the high bypass twin spool variety (generally denoted by the numeral 10). As is known in the art, such a gas turbine engine is mounted within a nacelle or outer housing 12 which defines an air inlet duct 14 at the forward end of the engine 10. The air inlet duct 14 supplies airflow to a low pressure, low speed compressor or fan stage 18 which is journalled within the nacelle 12. A portion of the air supplied by the fan stage 18 is supplied to a high pressure, high speed compressor 22 and the remaining portion is exhausted rearwardly through an annular duct 24 which is formed between the outer housing 12 and an inner housing 26 that encloses the compressor 22 and other elements of the engine core.

The high pressure air exits the compressor 22 to a generally annular combustor assembly 27. Fuel, injected into the combustor assembly 27 by a series of nozzles (not shown in FIG. 1) is mixed with the compressed air and ignited within the combustor assembly 27. The hot combustion gasses exiting the combustor assembly 27 drive a high pressure turbine stage 28 which, in turn, drives the high pressure compressor stage 22 through a shaft 30. A low pressure turbine stage 32, which is connected to the low pressure compressor stage 18 by a shaft 34 that passes coaxially through the shaft 30, is driven by the combustion products exiting the high pressure turbine stage 28. As the high temperature, high velocity combustion products exit the turbine 32, the gasses flow rearwardly through an exhaust nozzle 38 for discharge into the atmosphere as a thrust producing fluid stream. In the simplified diagrammatic engine representation of FIG. 1, the exhaust nozzle 38 is an annular duct that is formed between the inner housing 26 and a rearwardly projecting tailcone 40.

It will be recognized by those skilled in the art that twin spool, high bypass gas turbine engines can include structure not diagrammatically set forth in the engine 10 of FIG. 1. For example, such engines can be of the mixed flow variety wherein at least a portion of the fan bypass stream is not exited to the atmosphere through the duct 24, but flows rearwardly around the inner housing 26 and is mixed with the hot combustion products which exit the turbine stage 32 to provide increased thrust and lower jet noise. Further, the air inlet 14 and exhaust nozzle 38 can be of a controllable or variable geometry to respectively permit control over the airflow entering the engine and the expansion characteristics of the hot combustion products. As shall be recognized upon understanding the present invention, the hereinafter described monitoring system of this invention is not restricted to the particular type of engine 10 depicted in FIG. 1, but is suitable for use with virtually any type of gas turbine engine presently known or contemplated, including those used in applications other than propelling an aircraft. Further, although the following description of the invention is made with reference to a fixed configuration engine (i.e., an engine not having variable geometry inlet or exhaust nozzle structure), it will be recognized that the present invention can be practiced with engines having variable geometry structure by controlling the monitoring system of this invention so that engine monitoring is effected during periods in which the engine geometry is of a certain fixed configuration. Alternatively, in some situations, monitoring of variable geometry engine installations over a range of engine geometry will be possible by including means for sensing the present geometry of the engine and adaptively modifying the hereinafter described structure to compensate or account for engine performance parameter changes that occur due to the variable geometry structure.

Regardless of the type of engine being monitored, the performance monitoring system of this invention includes a number of sensors interconnected with the engine 10, sensors interconnected with control apparatus which determines the operating state of the engine 10, and conventional air data apparatus or appropriate sensors which supply signals representative of parameters such as aircraft speed and altitude. More specifically, in the arrangement of the invention depicted in FIG. 1, a first set of sensors 42-1, 42-2, . . . , 42-n, which are enclosed within broken line 44, supply signals representative of pressure or temperature at various locations or stations within the engine 10; a power level angle (PLA) sensor 46 supplies an electrical signal representative of the angular position of a throttle lever 48 which controls a fuel controller 50 to establish the engine power setting; and the air data system 51 of the aircraft utilizing the invention supplies signals representative of air data information which is utilized in the operation of the invention. As shall be described in more detail hereinafter, the number of signals utilized in the practice of this invention and the identity of each sensed parameter is determined both by the type of engine being monitored and by the desired system accuracy.

As is indicated in FIG. 1, the signals supplied by the set of sensors 44, the PLA sensor 46 and the air data system 51 are coupled to a digital processor unit 52 and in particular to a portion of the data processor 52 which is identified in FIG. 1 as an engine parameter simulator 54. As will be recognized by those skilled in the art, in a situation in which the above-described sensors and air data system supply analog signals, conventional analog-to-digital converters (not shown in FIG. 1) can be employed to provide appropriate digital signals to the digital processor 52. Further, in situations in which the sensors and/or air data system supply digital signals in a format different than that utilized within the digital processor 52, conventional digital-to-digital convertors can be employed.

The signals supplied by the set of sensors 44, the PLA sensor 46, and the air data system 51 (denoted as signals $s_1, s_2, \ldots, s_p$ in FIG. 1) are utilized by the engine parameter simulator 54 to determine a set of signals $\hat{y}_1, \hat{y}_2, \ldots, \hat{y}_n$ which represent the predicted or estimated values of a number of engine performance parameters. More specifically, and in terms of a mathematical description of the system operation, the engine parameter simulator 54 is arranged to supply a set of signals $\hat{Y}=CX$ where $\hat{Y}$ is a column vector which includes n estimated engine performance parameters, X is a column vector having m elements that are functions of the supplied signals $s_i$, $i=1, 2, \ldots, p$ (i.e., elements such as $s_i$, $s_q$ multiplied by $s_r$, and $s_u^{t/v}$ where j, q, r, t, u, and v are members of the set of positive and negative integers encompassing the range from one to m); and, C is a coefficient matrix of scalar elements having n rows and m columns. Thus, in scalar notation, each of the estimated performance parameters $\hat{y}_k$, $k=1, 2, \ldots, n$, is equal to $$\sum_{i=1}^{m} c_{ki}x_i,$$

where the subscripts i and k relate the associated elements y, c and x to the previously defined vectors and coefficient matrix.

It can be noted that, in the above mathematical expressions, the estimated or predicted engine performance parameters ($\hat{y}_k$) are dependent variables and the functions of the sensed engine operating signals ($x_i$) are independent variables. In accordance with this mathematical distinction and for the sake of descriptive clarity, those engine performance parameters that are estimated or predicted by the electronic parameter simulator 54 will be referred to hereinafter as dependent performance parameters. In a similar manner, those engine installation parameters and air data parameters utilized within the engine parameter simulator 54 to estimate the dependent performance parameters (e.g., the signals denoted as $s_1, s_2, \ldots, s_p$ in FIG. 1) and the functions thereof which are denoted as $x_1, x_2, \ldots, x_m$ in the above mathematical expressions will be referred to as independent performance parameters. It should become apparent from the following paragraphs that a particular engine parameter which is treated as a dependent performance parameter can also be utilized as an independent performance parameter in predicting the value of another dependent performance parameter.

In the practice of this invention, the independent performance parameters are not selected such that the above stated mathematical expressions reflect the gas generator characteristics of the particular engine being monitored. Rather, the independent performance parameters are selected from easily measured engine performance parameters, engine control functions, and air data information such that each selected set of independent performance parameters is statistically correlated with an associated dependent engine parameter. Essentially this distinction between the present invention and prior art gas turbine engine performance monitoring systems provides sets of independent performance parameters which are generic to and uniquely characterize the performance characteristics of the particular type of engine to be monitored whereas the associated coefficient values distinguish the particular engine being monitored from other engine units of the same type. Thus, through the automatic determination of the electronic simulation coefficient that is effected when the system of FIG. 1 is operated in the hereinafter described calibration mode, prior art problems and limitations associated with performance deviations between engines of the same manufacture and type that result because of engine manufacturing and installation tolerances are overcome. Further, as shall hereinafter become apparent, the electronic modeling or performance parameter simulation of this invention permits the present invention to be embodied such that a single embodiment of the invention is easily adaptable to the monitoring of any particular type of gas turbine engine.

Various techniques are known to those skilled in the art for obtaining a set of independent performance parameters which satisfy the above mentioned requirements. In particular, when dependent performance parameters such as the rotational speed of the low pressure compressor stage 18 of FIG. 1 (generally denoted in the art as N1), the fuel flow rate W, the engine pressure ratio (EPR), or the engine exhaust gas temperature (EGT) are to be determined, suitable independent performance parameters can be ascertained by applying known linear regression analysis techniques to engine operating data which includes information on these parameters and various other engine system variables which can be useful as independent performance parameters. Such system variables include the previously mentioned air data information such as aircraft altitude and speed, PLA and numerous measurable engine performance parameters. The data necessary for determining a suitable set of independent performance parameters can be gathered, for example, by operating a gas turbine engine of the type to be monitored and recording the pertinent engine operating information with apparatus such as that used in prior art ground based engine monitoring systems. Alternatively, such performance data is often made available by an engine manufacturer in the form of punched data cards or magnetic tape.

In any case, once the desired engine operating data is available, linear regression analysis of the data can be performed, for example, by known digital computing techniques wherein a computer is programmed to either automatically or, under the control of an operator, determine a set of independent variables and a set of corresponding coefficients which statistically describe a desired dependent variable in accordance with the data supplied to the computer and within a desired accuracy (e.g., within a specified least mean square error). Although the coefficients obtained by this analysis can be utilized as a "starting point" within an embodiment of this invention for automatically determining those coefficients which characterize the particular engine being monitored, it has been found that such a procedure is usually unnecessary and, as shall be described hereinafter, embodiments of this invention generally determine proper modeling coefficients even when arbitrary initial values (e.g., zero) are utilized.

At this point, it should be recognized that the above-described electronic simulation of this invention and the associated method of determining suitable independent performance parameters permits the invention to provide precise monitoring accuracy over virtually any range of engine operation. In particular, the engine operation data that is utilized in selecting the independent performance parameters can include data collected with the engine operating under various steady state conditions including various aircraft speeds, various power level level settings (PLA), and various external temperatures and pressures. Since a set of independent performance parameters selected in this manner reflects the operation of the engine in each of these operating states, the selected independent performance parameters will be valid in determining a predicted value of the associated dependent performance parameter over a corresponding range of engine operation. Accordingly, the present invention overcomes various other prior art difficulties that were previously set forth herein and a desired performance monitoring accuracy can generally be obtained over the entire operating regime of a monitored engine. For purposes of comparison with prior art airborne performance monitoring systems, it can be noted that the electronic simulation accuracy achieved with this invention generally is within one percentage point of the actual value of the predicted dependent performance parameter.

Having now a basic understanding of the operation of this invention to effect electronic simulation or modeling of a dependent performance parameter and with continued reference to FIG. 1, the estimated dependent performance parameters ($\hat{y}_1, \hat{y}_2, \ldots, \hat{y}_n$) are supplied to one set of input terminals of a difference unit 56. A second set of input terminals of the difference unit 56 receives signals representative of the actual value of the dependent performance parameters (denoted as $y_1, y_2, \ldots, y_n$ in FIG. 1) which are supplied by a set of conventional sensors that includes sensors 60-1, 60-2, . . . , 60-n. As is known in the art, it is often advantageous to normalize engine performance parameters to a standard temperature and pressure (e.g., 14.7 pounds/square inch and 518.7° R). In embodiments of the invention where parameter normalization is desired or necessary, the system of FIG. 1 can include suitable signal conditioning apparatus for normalizing appropriate ones of the performance parameters $y_j$.

The difference unit 56 is a conventional circuit arrangement that determines the difference in value between each monitored dependent performance parameter y hat$_j$, $j=1$, n and the corresponding estimated dependent performance parameter $y_j$, $j=1, \ldots, n$ to thereby supply a set of deviation signals, $z_j = y_j - \hat{y}_j + \epsilon_j$, $j=1, \ldots, n$ to a system fault logic 62 and to a portion of the digital processor 52 that is identified in FIG. 1 as a simulator coefficient estimator 64. Alternatively, in hereinafter described embodiments of the invention wherein the engine parameter simulator 54 and/or the simulator coefficient estimators 64 are realized by a programmable digital computer or microprocessor circuit, such computer or microprocessor can be programmed to provide the deviation signals.

Figure 4:
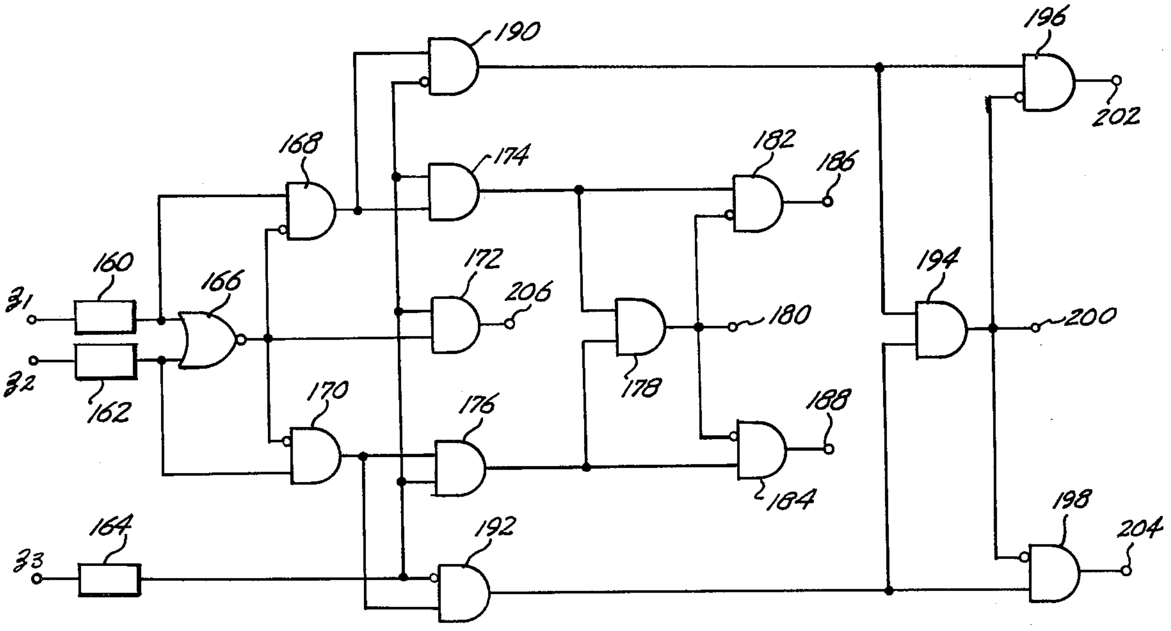
FIG. 4 is a circuit diagram of a logic arrangement which can be utilized in the practice of this invention to realize the fault logic depicted in FIG. 1.

Fault logic 62 includes an arrangement of conventional logic gates or other logic circuit arrangements for logically combining the deviation signals in a manner which supplies one or more signals indicative of a fault within the system sensors 60, the data processor 52, and/or the gas turbine engine 10. For example, in one arrangement that is depicted in FIG. 4, the system utilizes three sensors 60 and the fault logic 62 is an arrangement of logic gates which supplies signals indicative of a fault within any one of the three sensors, a fault in the electronic simulation of each of the three estimated dependent performance parameters (fault within digital processor 52) or a fault within the engine 10.

The signals supplied by fault logic 62 are coupled to an annuciator unit 66 to energize display units 68 that visually indicate the detected fault condition to the flight crew or other concerned personnel. The display units 68 can be a variety of conventional devices ranging from conventional indicator lamps and aural warning devices to more complex apparatus such as hard copy printout devices.

In accordance with this invention, coefficient estimator 64 is arranged to effect digital signal filtering which determines the modeling coefficients (c) during operation of the invention in the calibrate mode and to effect similar digital filtering during engine performance monitoring (system operation in "monitor" mode) which provides signals indicative of temporal characteristics of the deviations in the monitored dependent performance parameters. Such temporal characteristics or trend information indicate gradual engine deterioration which is attributable to normal wear and also can provide an indication or warning of an imminent engine fault. As is indicated in FIG. 1, the coefficient estimator 64 is controlled by a system mode selector 70 such that the coefficients determined by the coefficient estimator 64 are directed to the engine parameter simulator 54 when the system is operated in the calibrate mode and are directed to a trend logic unit 72 when the system is operated in the monitor mode. More specifically, in the arrangement of FIG. 1, switching apparatus which is schematically represented by a conventional single pole, single throw switch 74 is activated in conjunction with a conventional selector switch 76 of the system mode selector 70 such that the coefficient signals supplied by the coefficient estimator 64 are routed in the previously described manner.

The selector switch 76 of mode selector 70 is also utilized in conjunction with a steady state sensor 78 which detects whether or not the monitored engine is operating in a steady state condition (e.g., whether or not the engine is being controlled to transist between operating states at a relatively rapid rate) to inhibit operation of the monitoring system during transient operating conditions. Although, in some situations it may be possible to utilize a monitoring system of this invention under nonsteady state operating conditions, the values of the monitored dependent performance parameters are not necessarily correlated with the independent performance parameters in the same manner as they are during steady state operation. Accordingly, extremely accurate performance monitoring may not be effected during periods of nonsteady state operation and it is often advantageous to inhibit system operation during the short periods of time in which the engine is not operating in a steady state condition.

A suitable steady state sensor 78 can be configured in a variety of manners and generally compares an engine command signal such as the commanded rotational speed of the low pressure compressor or fan stage 18 in the engine 10 with the actual value of that parameter (i.e., N1). For example, in the steady state detector 78 of FIG. 1, one input terminal of a comparator 80 is connected to a terminal 82 which receives a signal proportional to the commanded fan speed (or other suitable engine command) and the second input terminal of the comparator 80 is connected to the sensor 42-1 for receiving a signal representative of the actual value of N1.

Thus, the comparator 80 supplies an output signal (i.e., a logical one) only when the actual value of N1 corresponds to the commanded value. This output signal is connected to an inverting input terminal of a two-input AND gate 84. The second input terminal of the AND gate 84 is connected to the selector switch 76 of the mode selector 70 which is interconnected such that an electrical potential equivalent to a logical one is supplied to the AND gate 84 whenever the system is operating in either the calibrate or monitor mode. Thus, AND gate 84 will supply an inhibit signal which is a logical one during nonsteady state conditions and will supply a logical zero during operation of the engine in a steady state condition. This signal is supplied to the engine parameter simulator 54 to effectively disable electronic parameter simulation during nonsteady state conditions.

Like the electronic simulation utilized in this invention, the general arrangement of the coefficient estimator 64 can best be understood by first considering the underlying mathematical expressions which describe the digital filtering that is effected within this portion of the invention. More specifically, the digital filtering that is effected within the coefficient estimator 64 is known to those skilled in the art generally as recursive digital filtering, and is particularly known as Kalman signal filtering or estimation.

In matrix notation, the Kalman filtering utilized for each of the dependent parameters is given by the expressions:

$$\hat{C}_K=\hat{C}_{K-1}+G_K[y_K-X_K^T\hat{C}_{K-1}] \quad (1\text{-A})$$

$$G_K=P_{K-1}X_K[X_K^TP_{K-1}X_K+R]^{-1} \quad (1\text{-B})$$

$$P_K=P_{K-1}-G_KX_K^TP_{K-1} \quad (1\text{-C})$$

where y is the value of the monitored dependent performance parameter; X is a vector which includes each of the independent performance parameters; G is a vector of weighting factors or gain factors, P is the coefficient error covariance matrix, R is an apriori scalar estimate of the modeling error variance; C is a vector of the estimated coefficients; K and K−1 respectively indicate the value of the indicated variable during a current sampling interval and its value at the previous or lastmost antecedent sampling interval and superscript T denotes the vector transpose operation. With reference to the previously described operation of the system of FIG. 1, it can be noted that the term $[y_K-X_K^T\hat{C}_{K-1}]$ corresponds to each deviation signal supplied by the difference unit 56 (i.e., the signal $z_k$, k=1, 2, . . . , n) and that, in the situation in which the system is embodied to sequentially monitor the n dependent performance parameters and utilize m independent performance parameters to obtain the desired degree of estimation accuracy, the vectors C and X have m elements, the matrix P includes m rows and m columns, and the vector G includes m Kalman gain constants.

Regardless of whether the coefficient estimator 54 is utilized to supply trend signals (operation in the monitor mode) or in the determination of coefficient values for the engine parameter simulator 54 which distinguish the particular engine being monitored from other engines of the same type (operation in the calibration mode), the coefficient estimator 54 proceeds through a series of operations in which it combines various system signals and the above defined variables P and G to determine a set of coefficient values C which will be utilized in the next operational sequence of the coefficient estimator 54. More specifically, during operation in the calibrate mode, the coefficient estimator 54 sequentially determines an estimated coefficient vector ($\hat{C}_K$) for each of the monitored dependent performance parameters $\hat{y}_k$, k=1, 2, . . . , n. As is indicated by Equation 1-A, each estimated coefficient vector is based on the previous value of the coefficient vector ($\hat{C}_{K-1}$), i.e., the coefficient values determined during the nextmost antecedent coefficient estimation sequence, a gain vector ($G_K$) and the projected value of the previously described associated deviation signal $z_K=y_K-X_K^T\hat{C}_{K-1}$. During this sequence, the gain vector G is determined in view of the present values of the independent performance parameters ($X_K$), the matrix $P_{K-1}$, which was determined by the coefficient estimator 64 during the previous or nextmost antecedent coefficient estimation sequence and a scalar value of R which is selected in view of modeling accuracy and repeatability of the sensors 58 in FIG. 1. Appropriate error variance terms R can be determined by conventional apriori regression analysis (e.g., the variance of the regression residuals) and by augmenting such variance terms with empirically or statistically obtained terms relating to the sensors 60. Additionally, to provide a proper matrix $P_K$ for use during the nextmost operating sequence (as the matrix $P_{K-1}$), the coefficient estimator 64 combines the gain vector (G) with the present values of the independent performance parameters (X) and the error covariance matrix that was determined during the nextmost antecedent coefficient estimation sequence ($P_{K-1}$).

From equations 1A through 1C and from the above description, it can be recognized that each embodiment of the data processor 52 necessarily includes storage registers for maintaining signals representative of the coefficient vector $\hat{C}$, and a coefficient error matrix P. Additionally, it can be recognized that initial values of these quantities should be contained within the appropriate storage registers to enable the coefficient estimator 64 to begin operation, i.e., values for use during the first operating sequence of the system calibration mode. In this respect, and as previously mentioned, the coefficients which result during the statistical analysis utilized in selecting a set of suitable independent variables $x_i$, I=1, 2, . . . , m can be utilized as the initial coefficients of the matrix $\hat{C}$. However, because of the accuracy and reliability of the electronic simulation and digital filtering utilized in this invention, it has been found that arbitrary initial coefficient values (e.g., zero) can be utilized without affecting either the overall system accuracy or substantially increasing the number of sequential estimation operations required to obtain coefficients which distinguish the monitored engine from all others of the same type. Further, it is noteworthy that, through initial evaluation and analysis of this invention, it has been found that a set of selected independent performance parameters which are satisfactory for use with one particular engine are often satisfactory for use with another type of engine. For example, with respect to gas turbine engines of the twin spool high bypass variety, the same set of independent performance parameters is generally capable of characterizing either the JT8 or JT9 engines, manufactured by Pratt-Whitney, or a CF-6 engine, manufactured by General Electric Company. Because of this and the above-noted fact that the system calibration mode provides suitable coefficients even when arbitrary coefficient values are initially assumed, it can be recognized that it is possible to embody the invention such that the monitoring system is not only itself adaptive to a particular engine within a particular type of engine (e.g., the previously mentioned JT8 engine), but is selfadaptive to any particular engine within a rather broad engine class (e.g., high bypass, twin spool gas turbine engines).

The initial values of the elements of the P matrix are generally best determined experimentally during the design of each particular embodiment of this invention. In this respect, it can be shown that, in order to ensure convergence in the coefficient estimation with repetitive operation of the coefficient estimator 64, the initial P matrix must be a positive definite matrix. In particular, it has been found that satisfactory results are obtained by utilizing a positive definite diagonal matrix for P wherein each off-diagonal element is equal to 0 and each diagonal element is equal to the product $C_P TR[P^*]$, where $C_P$ is an experimentally determined constant selected to provide a dynamic filtering range sufficient to achieve the desired calibration accuracy over the engine operating range of interest, $P^*$ is the coefficient dispersion matrix (as determined during the linear regression analysis utilized in selecting the independent performance parameters) and TR[.] indicates the matrix trace operation.

In a performance monitoring system of this invention which is embodied to provide the previously mentioned trend information, the electronic parameter simulation that is effected within the data processor unit 52 is augmented to include a polynomial of time dependent terms, and signals representative of the coefficients of such time dependent terms are coupled to the trend logic 72. More specifically, in such an embodiment of the invention, the engine parameter simulator 54 electronically simulates the current value of each dependent engine parameter $\hat{y}_k$, k=1, 2, . . . , n, in accordance with the mathematical expression:

$$\hat{y}_k = \sum_{i=1}^{m} \hat{c}_i x_i + \sum_{q=0}^{r} \hat{b}_q T^q + \epsilon_k \quad (2)$$

where $c_i$ and $x_i$ are respectively the previously defined simulation coefficients and independent performance parameters; $\epsilon_k$ is the previously defined modeling error; T is representative of the time over which the engine has been monitored (i.e., $T=KT_S$ where $T_S$ is the "system sampling period" or, more precisely, the time interval between the successive estimations of the dependent performance parameters, and K indicates the number of sequential estimations which have been performed); and r indicates the order of the time dependent polynomial. Thus, it can be seen that each such augmented estimate of a dependent performance parameter includes the r+1 additional terms $b_rT^r+b_{r-1}T^{r-1}+ \ldots +b_0$ wherein the value of the coefficients at any particular time after a hereinafter described initial period provides a substantially accurate representation of the temporal characteristics of the deviation in a monitored dependent engine parameter.

With respect to choosing a suitable order r for the time dependent polynomial, it has been found that utilizing first order or linear trending estimation (i.e., a. time dependent term $b_1T+b_0$) does not generally provide satisfactory results, especially with respect to rapidly changing deviations in the monitored dependent performance parameter. On the other hand, it has been found that a quadratic trending polynomial ($b_2T^2+b_1T+b_0$) generally provides satisfactory results. Thus, in realizing an embodiment of this invention it is generally advisable to utilize a trending polynomial of at least second order.

In considering the previous discussion of the Kalman filtering that is effected in accordance with this invention, it can be recognized that the trend coefficients $b_q$, q=0, 1, . . . , r can be determined by procedure and structure substantially identical to that used in determining the simulation coefficients during the operation of the system in the calibrate mode. In particular, it can be recognized that if a vector T which includes the elements $T^q$, q=0, 1, . . . , r is substituted for the independent performance parameters (X) in the previously described operation of the coefficient estimator 64, and the deviations $z_i$ are substituted for the dependent parameters $y_i$, an estimated trend coefficient vector B having elements $b_q$, q=0, 1, . . . , r will be supplied with each sequential operation of the coefficient estimator 64. Further, if such a coefficient estimator is utilized and activated to provide a trend coefficient estimate, each time the engine parameter simulator 54 provides an estimate of the associated dependent performance parameter $\hat{y}_k$, k=1, 2, . . . , n, a set of trend coefficients $b_q$ will be supplied for each dependent performance parameter which accurately describes the time varying deviation of that particular dependent performance parameter. It should be noted since the estimation of trending coefficients and the estimation of simulation coefficients are mutually exclusive events in that the former is necessary only when the system is operating in the monitor mode and the latter is necessary only when the system is operating in the calibrate mode, it is possible to simplify the structural arrangement of the coefficient estimator 64 through a logic design to effectively share a single logic circuit. In a similar manner, in the embodiment of the invention described relative to FIG. 7, a digital computer or microprocessor utilizes a single set of computational and logic instructions to effectively realize the operation of the coefficient estimator 64 in determining both the performance parameter simulation coefficients and the trend coefficients while simultaneously realizing the engine parameter simulator 54. Regardless of the type of embodiment employed, and as previously mentioned, signals representative of the trend coefficients $b_q$, q=0, 1, . . . , r are supplied to the trend logic 72 during each monitoring operation of the system depicted in FIG. 1.

Figure 5:
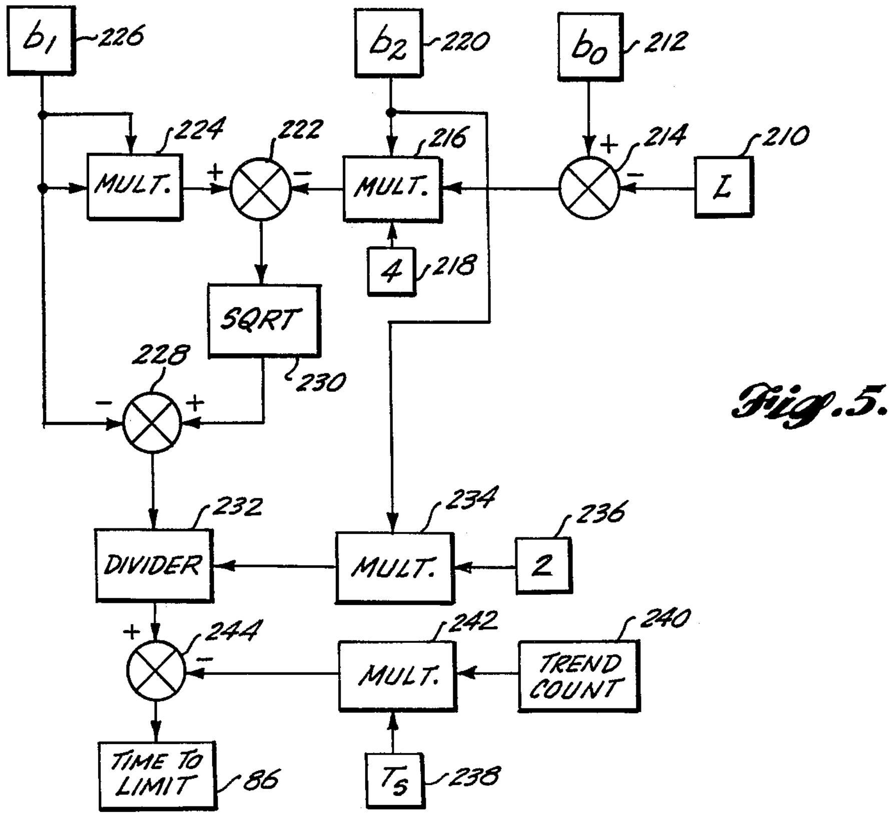
FIG. 5 is a circuit diagram of an arrangement useful in understanding the trend logic illustrated in the block diagram of FIG. 1, which arrangement represents one type of trend logic which can be utilized in the practice of this invention.

Trend logic 72 can include a variety of arrangements for providing prognostic information that is based on the supplied trend coefficients and which provides an appropriate indication to the aircraft crew (e.g., through a conventional alphanumeric display unit 86 in FIG. 1). With respect to various arrangements for utilizing the trend coefficients of a quadratic trend estimation, it can be seen that each coefficient $b_0$ effectively represents a bias term which reflects the total deterioration that has occurred in an associated dependent performance parameter monitored by the system throughout the entire period of engine monitoring (accumulated steady state operating time); each coefficient $b_1$ effectively represents the present rate of change relative to the deterioration in each associated dependent performance parameter; and, each coefficient $b_2$ effectively represents an "acceleration" or the present time rate of change in the deterioration rate of each associated dependent performance parameter. Thus, in some situations, it may be advantageous to implement trend logic 72 such that the coefficients $b_2$ and $b_1$ are compared to preascertained limits to assure that no rapid changes in the deterioration of a dependent performance parameter are taking place and such that the coefficient $b_0$ is compared with another preascertained limit, which is representative of the deterioration in the associated dependent performance parameter that should be tolerated prior to engine recalibration, overhaul or maintenance. Such an implementation can provide a go/no-go dispatchability status of the aircraft. Various other methods and apparatus for utilizing the trend coefficients supplied in accordance with this invention will be apparent to those skilled in the art, for example, the coefficients $b_1$ and $b_2$ can be combined to detect relatively rapid changes in coefficient value to thereby detect a sudden increase in the deterioration rate of one or more of the monitored performance parameters. Such an implementation would be indicative of an imminent engine fault. Further, an arrangement for determining the estimated engine operating time which remains before engine overhaul or maintenance should be undertaken will be described relative to the trend logic arrangement that is depicted in FIG. 5.

As is known, the accuracy of an arrangement for recursive signal estimation or digital filtering such as the Kalman filtering utilized to estimate the trend coefficients increases with the amount of signal data that is processed. In this respect, it can be said that the signal estimate asymptotically converges to the true signal value as the number of times the previously described filtering or estimation sequence has been performed increases. Since, as previously described, the trend coefficients are estimated each time the digital processor 52 supplies an estimated value of the associated dependent performance parameter, it can thus be recognized that the system of this invention effectively requires a "gestation period" before highly accurate trend information is provided. In this respect, it is also known that the number of operational sequences which are required for a specified coefficient estimation accuracy depends on factors such as the amount of signal noise present (signal-to-noise ratio) and the system signal sampling rate. In this respect, present indications are that sampling rates on the order of 10–40 samples per hour are generally satisfactory and enable the trending estimator to detect deterioration rates in the monitored dependent performance parameters on the order of 0.001 percent to 0.04 percent per sampling interval with an estimation accuracy of at least 1 percent. In such an embodiment, 60 hours or less of steady state engine operation is required for the estimated trend coefficient to reach the desired accuracy. Further, the trend coefficients can be utilized before 60 hours of engine operation have been accumulated if compromises can be made in the estimation accuracy. For example, in one evaluation of the invention wherein a one percent estimation accuracy is achieved within 60 hours of engine operation, the trending estimation was accurate within a standard deviation of 4 percent after 40 hours of engine operation.

Generally, the fact that precise trending information is not available until the engine has been monitored for a specific time (i.e., until a sufficient number of trending estimates have been performed) is not a substantial limitation. In this respect, the need for the prognostic information is generally not as great during such an initial period of engine operation. Because of this characteristic, however, it may be advantageous to provide apparatus for manually or automatically disabling the trend indication (such as the display device 86 in FIG. 1) until this initial period has elapsed. Alternatively, it will be recognized by those skilled in the art that, during each of the sequential operations of the coefficient estimators 64, the coefficient error covariance matrix P is indicative of the relative accuracy of the supplied trend coefficients. Accordingly, signals representative of this matrix can be combined by an appropriate logic arrangement to activate an indicator when the desired estimation accuracy is attained. Further, if desired, signals representative of the matrix P can be utilized in a suitable logic arrangement to provide a continuous indication of the error in the trend coefficients and thereby provide a constant measure of confidence in the supplied trend information.

Figure 2:
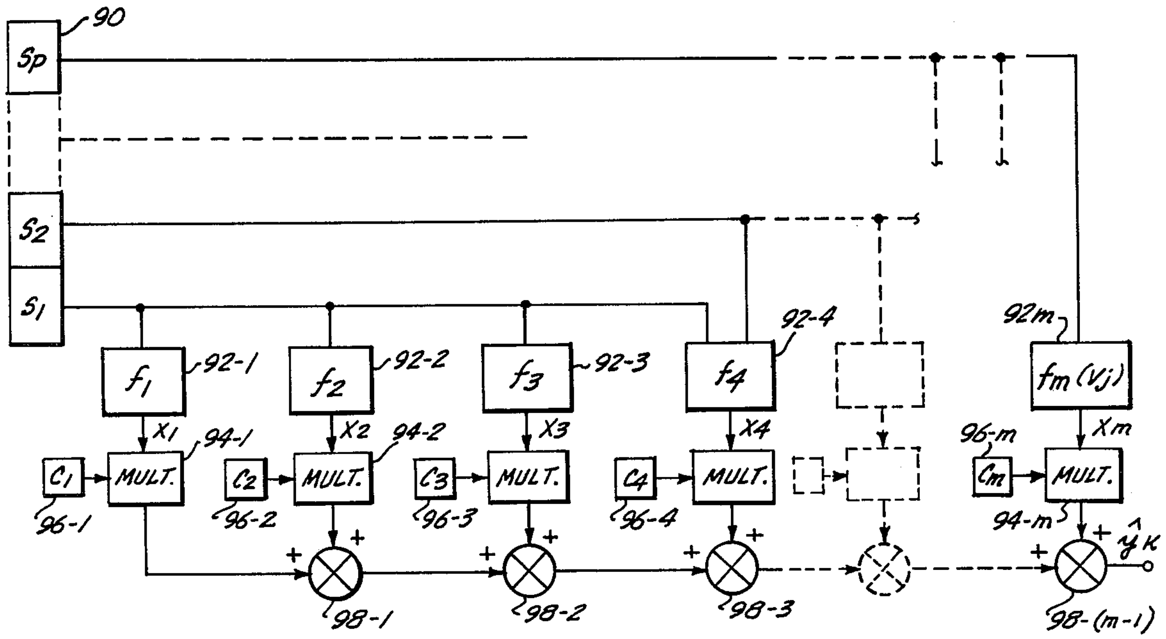
FIG. 2 is a block diagram that is useful in understanding the electronic simulation or modeling used in the practice of this invention and further illustrates one manner of structurally embodying the electronic modeling portion of the digital processor depicted in FIG. 1.

FIG. 2 indicates one structural arrangement which can be utilized in realizing the engine parameter simulator 54 and which further illustrates the previously described electronic simulation of the dependent performance parameter. In the arrangement of FIG. 2, the signals supplied, for example, by the set of sensors 44, the PLA sensor 46 and the air data system 51 which are utilized to form the independent performance parameters ($x_i$, $i=1, 2, \ldots, m$) are loaded into a digital storage register or latch 90 in time coincidence with a timing signal that is supplied by a system clock (not shown in FIG. 2) which supplies one pulse at the beginning of each system sampling period. The signals supplied to the latch 90 are coupled to function generating units 92-i, $i=1, 2, \ldots, m$ which are arranged to supply current values of the desired independent performance parameters $x_i$, where, as previously described, each independent performance parameter is identically equal to one of the signals $s_i$, is equal to the product of two (or more) signals $s_k$ and $s_j$, or is a single signal $s_p$ raised to a rational power. For example, in the arrangement indicated in FIG. 2, function generating unit 92-4 can be a conventional multiplier circuit to thereby supply a signal $x_4=s_1s_2$. Further, for the sake of illustration, the function generators 92-1, 92-2 and 92-3 can be considered as being arranged for determining the square root of the applied signal $s_1$, the square of the applied signal $s_1$, and the 3/2 power of the applied signal $s_1$—each of which arrangements can be realized by conventional logic circuits.

To determine the product of the signals $x_i$, $i=1, 2, \ldots, m$ and the associated simulation coefficients $c_i$, $i=1, 2, \ldots, m$, the signals supplied by the function generating units 92-i are coupled to one input terminal of an associated multiplier circuit 94-i, $i=1, 2, \ldots, m$, with each multiplier circuit 94-i having its second input terminal connected to a storage location 96-i, within a conventional latch or storage register 96. Since the previously described simulation coefficients are loaded into the storage locations 96-i from the coefficient estimator 64 during operation of the system in the calibrate mode, the signals which are supplied by the multiplier circuits 94-i can be summed with one another or accumulated to provide the desired estimate of the monitored dependent performance parameter $$(\hat{y}_k = \sum_{i=1}^{m} c_i x_i).$$

In the arrangement of FIG. 2, this summation is effected by adders 98-i, $i=1, 2, \ldots, (m-1)$, with the adder 98-1 supplying a signal representative of $c_1x_1+c_2x_2$ to one input terminal of the adder 98-2 which, in turn, sums this signal with a signal representative of $c_3x_3$ to provide a signal representative of $c_1x_1+c_2x_2+c_3x_3$. As is indicated in FIG. 2, the remaining adders 98-4 through 98-(m−1) are connected in a like manner so that the final adder supplies the desired estimate of the dependent performance parameter. With the type of embodiment depicted in FIG. 2, additional arrangements substantially identical to that of FIG. 2 are utilized to provide signals representative of any other dependent performance parameters which are to be monitored and each of the signals y $\text{hat}_k$, k=1, 2, . . . , n are coupled to the difference unit 56 of FIG. 1.

The arrangement collectively depicted by FIGS. 3A-3C indicates one arrangement that can be employed in realizing the coefficient estimator 64 of FIG. 1 and further illustrates the Kalman recursive digital filtering or signal estimation utilized in this invention. For simplicity, FIG. 3 illustrates a situation in which a single estimated dependent performance parameter y hat$=c_1x_1+c_2s_2$ is being monitored wherein the independent performance parameter $x_1$ is equal to $s_1s_2$ and the independent performance parameter $x_2$ is identically equal to $s_2$. Further, FIG. 3 is arranged such that FIG. 3A depicts structure that performs the circuit operations mathematically represented by Equation 1-B (determination of an appropriate gain vector G); FIG. 3B depicts structure that performs the circuit operations mathematically represented by Equation 1-A (determination of the estimated coefficient vector $\hat{C}$); and FIG. 3C depicts structure that performs the circuit operations mathematically represented by Equation 1-C (determination of the coefficient error covariance matrix P).

Referring now to FIG. 3a and assuming that the depicted arrangement is performing the "$K^{th}$" operational sequence of the previously described system calibration mode, a conventional latch circuit or storage register 100 stores the values of the P matrix that were obtained during the previous (K−1) operational sequence of the depicted coefficient simulator and were loaded into the latch 100 by an appropriate clock signal at the conclusion of the previous operational sequence. Thus, in terms of Equation 1-B, the latch 100 holds the matrix $P_{K-1}$ during the $K^{th}$ coefficient estimation sequence. Signals representative of the stored values of $p_{11}$, $p_{12}$, $p_{21}$ and $p_{22}$ (where the two numerals of each subscript respectively denote the row and column location of the scalar values which comprise the matrix P) are supplied from the latch 100 to one input terminal of conventional multiplier circuits 102-1, 102-2, 102-3, and 102-4, respectively. The second input terminal of the multipliers 102-1 and 102-3 are both connected for receiving a signal representative of the current value of the independent performance parameter $x_1$ (denoted as $x_1(K)$ in FIG. 3A) and the second input terminal of the multipliers 102-2 and 102-4 are both connected for receiving a signal representative of the current value of the independent performance parameter $x_2(K)$.

In the arrangement of FIG. 3, the signals $x_1(K)$ and $x_2(K)$ are supplied by structure corresponding to that described relative to the arrangement of FIG. 2, and in accordance with the previously mentioned example of $x_1=s_1s_2$ and $x_2=s_2$. In particular, in the arrangement of FIG. 3A, the latch 90 supplies the signals $s_1$ and $s_2$ to the two input terminals of a conventional multiplier (function generating unit) 92-1 which thereby supplies the signal $x_1(K)$ and the signal $s_2$ is supplied as the signal $x_2(K)$ by the latch 90.

To provide signals representative of the vector $P_{K-1}X_K^T$ of equation 1-B, the signals supplied by the multipliers 102-1 and 102-2 are summed within an adder circuit 104 and the signals supplied by the multipliers 102-3 and 102-4 are summed within an adder circuit 106. As is denoted by the terms $PX_1$ and $PX_2$ in FIG. 3A, this vector includes two scalar values in the depicted arrangement.

The signals supplied by the adders 104 and 106 are respectively supplied to multipliers 108 and 110 having the second input terminals thereof connected for respectively receiving the signals $x_1(K)$ and $x_2(K)$ to provide a signal representative of $X_K^TP_{K-1}X_K$. To provide a signal representative of the scalar term $(X_K^TP_{K-1}X_K+R)^{-1}$ of equation 1-B, the signals supplied by the multipliers 108 and 110 are supplied to an adder 112 which also receives a signal representative of the previously described scalar estimate of the modeling error variance R which has previously been stored in a memory register 114. To provide a signal representative of the reciprocal of the signal supplied by the adder 112, the output of the adder 112 is connected to one input terminal of a divider 116 having its second input terminal connected for receiving a signal representative of the scalar 1 which is stored in a read-only memory register 118 or provided by other suitable signal means. The signal provided by the divider 116 is coupled to two multiplier circuits 118 and 120 that respectively receive their second input signals from the adders 104 and 106. Since, as previously described, the adders 104 and 106 provide the two terms which result from the matrix multiplication $P_{K-1}X_K$, it can be recognized that the multipliers 118 and 120 respectively supply signals proportional to the scaler quantities $g_1$ and $g_2$ where $g_1$ and $g_2$ are the two elements of the gain vector $G_K$, i.e., the multipliers 118 and 120 supply the solution to Equation 1-B for the depicted example.

FIG. 3B depicts an arrangement for determining the new coefficient estimates $\hat{c}_1$ and $\hat{c}_2$ based on the signals $g_1$ and $g_2$ (supplied by the multipliers 118 and 120 of FIG. 3A); the coefficients $\hat{c}_1(K-1)$ and $\hat{c}_2(K-1)$ which are respectively stored in storage registers or latches 122-1 and 122-2 at the completion of the previous (K−1) sequence of the coefficient estimator 64; a signal $y_K$ representative of the present actual value of the monitored dependent performance parameter (e.g., a signal supplied by a sensor 58 of FIG. 1 and strobed into a latch or memory register 124 at the beginning of the present or $K^{th}$ coefficient estimation sequence); and, the signals $x_1(K)$ and $x_2(K)$ which are supplied as indicated in FIG. 3A. In particular, in the arrangement of FIG. 3B, a multiplier 126 receives signals representative of $x_1(K)$ and $\hat{c}_1(K-1)$ and a multiplier 128 receives signals representative of $x_2(K)$ and c $\text{hat}_2(K-1)$. The signals supplied by the multipliers 126 and 128 are summed in an adder 130 to thereby provide a signal representative of the term $X_K^T\hat{C}_{K-1}$ of Equation 1-A. This signal is subtracted from a signal representative of the current value of the monitored dependent performance parameter Y(K) within a subtractor 132 and the resultant signal is supplied as an input signal to two multiplier circuits 134 and 136. The second input terminals of the multiplier circuits 134 and 136 are respectively connected for receiving the signals representative of the filter gain constants of $g_1$ and $g_2$ which are supplied by the arrangement of FIG. 3A. Additionally, an adder circuit 138 receives the signal supplied by the multiplier 136 and a signal representative of the coefficient $\hat{c}_1(K-1)$ from the storage register 122-1 to provide the new coefficient estimate $\hat{c}_1(K)$. In a similar manner, an adder circuit 140 receives the signal supplied by the multiplier 134 and a signal representative of the previous coefficient estimate $\hat{c}_2(K-1)$ from the storage register 122-2 to supply a signal representative of the new coefficient value $\hat{c}_2(K)$. As the $K^{th}$ operating sequence of the coefficient estimator ends, the signals $\hat{c}_1(K)$ and $\hat{c}_2(K)$ are loaded into the storage registers 122-1 and 122-2 for utilization during the next operational sequence of the coefficient estimator or, if coefficients which provide the desired system accuracy have been attained, for use within the engine parameter simulator 54 during operation in the previously described monitor mode.

FIG. 3C depicts an arrangement for determining current values of $p_{11}$, $p_{12}$, $p_{21}$, and $p_{22}$, i.e., the $P_K$ matrix which will be utilized during the nextmost subsequent coefficient estimation sequence (as the matrix $P_{K-1}$) to determine appropriate filter gains $g_1$ and $g_2$. In the circuit depicted in FIG. 3C, the $PX_1$ signal supplied by the adder 104 of FIG. 3A is combined with a signal representative of the filter gain $g_1$ (supplied by the multiplier 118 of FIG. 3A) in a multiplier circuit 142 and is also combined with a signal representative of the filter gain $g_2$ (supplied by the multiplier 120 of FIG. 3A) in a multiplier 144. In a like manner, the $PX_2$ signal supplied by the adder 106 of FIG. 3A is combined with the signal representative of the filter gain $g_1$ in multiplier 146 and is also combined with the signal representative of the filter gain $g_2$ in a multiplier 148. The output signals provided by the multipliers 142, 144, 146 and 148 are respectively coupled to the subtractive input terminals of subtractor circuits 149, 150, 152 and 154. Signals representative of the elements within the P matrix that were determined during the previous (K−1) operational sequence of the coefficient estimation arrangement of FIG. 3 (i.e., $p_{11}(K-1)$, $p_{12}(K-1)$, $p_{21}(K-1)$ and $p_{22}(K-1)$) are respectively supplied from the memory locations 100-1, 100-2, 100-3, and 100-4 to the additive input terminals of the subtractors 149, 152, 150 and 154. Viewing this arrangement, it can be recognized that the subtractors 149, 150, 152 and 154 accordingly supply signals representative of the desired matrix elements $P_{11}(K)$, $P_{12}(K)$, $P_{21}(K)$, and $P_{22}(K)$. To make these signals available for use within the circuit arrangement of FIG. 3A during the next operational sequence, the signals are loaded into the memory locations 100-1, 100-2, 100-3 and 100-4 by the previously mentioned clock pulse which is supplied at the conclusion of each operational sequence of the coefficient estimator.

In view of the above-described single operational sequence of the coefficient estimation arrangement of FIG. 3, it can be recognized that coefficient estimation described relative to the operation of the system of FIG. 1 in the calibration mode can be effected by repetitive operation (clocking) of the arrangement depicted in FIG. 3. As described relative to Equations 1-A through 1-C, each operational sequence causes a refinement or improvement in the accuracy of the simulation coefficients and various criteria such as the projected estimation error $y_k - X_K{}^T C_{k-1}$ of Equation 1-A can be used to determine whether a present value of the coefficients is adequate to effect a desired system monitoring accuracy. Further, from the previous description of the estimation of trend coefficients, it can be recognized that a second circuit arrangement identical to that indicated by FIG. 3, or the very same circuit arrangement, can be utilized to obtain the desired trend coefficients by supplying the signals representative of the elapsed monitoring time to the multipliers 102 and the multipliers 126 and 128. As previously discussed, during trending operation, the coefficient estimator is activated or clocked to perform a single operational sequence each time the engine parameter simulator 54 supplies an estimate of the monitored dependent performance parameter. (i.e., operated once during each system sampling period).

As described relative to the system arrangement depicted in FIG. 1, various arrangements of fault logic 62 can be utilized to provide an indication of a fault within the engine 10, the data processor 52 and/or the sensors 60-j, j=1,2, . . . , n which provide the actual values of the monitored dependent performance parameters. Basically, the arrangement that is most advantageously employed with any particular embodiment of the invention depends primarily on the specific dependent performance parameters being monitored and the fault information that can be obtained by combining such dependent performance parameters. In this respect, those skilled in the art are aware of various fault analyses which can be utilized in an attempt to locate or isolate the engine component or components that cause a particular engine fault. For example, in the previously referenced patent to Urban, diagnostic logic is disclosed which utilizes conventional combinatorial logic operations (e.g., those effected by conventional AND and OR gates) to indicate problems within various engine stages such as the low pressure and high pressure compressors, the low pressure and high pressure turbines, and the combustor assembly on the basis of detected deviations in various engine performance parameters.

The circuit arrangement depicted in FIG. 4 further exemplifies various logic that can be utilized as the fault logic 62 of FIG. 1 and illustrates that such fault logic can be arranged not only to detect a fault within the engine 10, but to also detect various component failures or faults within the monitoring system itself. For descriptive clarity, the arrangement depicted in FIG. 4 is based on an embodiment of the invention wherein three dependent performance parameters are monitored with the difference unit 56 of this system depicted in FIG. 1 accordingly supplying three deviation signals ($z_1$, $z_2$ and $z_3$) which represent the difference between the actual value of each monitored dependent performance parameter and the associated predicted value that is supplied by the engine parameter simulator 54.

In the circuit arrangement depicted in FIG. 4, the deviation signals $z_1$, $z_2$, and $z_3$ are respectively supplied to detector circuits 160, 162 and 164 which can be conventional comparator circuits or the like that supply a logical one when the applied deviation signal exceeds a predetermined value. Additionally, the detector circuits 160, 162 and 164 can be arranged for comparing various conventional deviation variables such as percent point of deviation (i.e., $100z_k/y_k$) with predetermined threshold values instead of the difference signal $(y_k - \hat{y}_k)$. Further, if desired or necessary, digital filtering of the deviation signals can be performed either within the detector circuits 160, 162 and 164 or prior to supplying the signals to such detector circuits.

In any case, the signals supplied by the detector circuits 160 and 162 are respectively coupled to an input terminal of two AND gates 168 and 170 and are coupled to the two input terminals of a NOR gate 166. The AND gates 168 and 170 of FIG. 4 are of the type often called inhibit gates in that such gates include an "inverting" input terminal (denoted in FIG. 4 by the small circle at such inverting input terminals) that performs the operation of logical negation. As is known in the art, such gates can be realized by connecting an inverter circuit to one input terminal of a conventional AND gate, and, with respect to a two input AND gate having an inverting input terminal, such a gate supplies a logical one signal only when the signal applied to the inverting input is a logical zero and the signal applied to the other input terminal is a logical one.

In the circuit of FIG. 4, the signal supplied by NOR gate 166 is commonly connected to the inverting input terminals of AND gates 168 and 170 and is also connected to one input terminal of an AND gate 172. The second input terminal of the AND gate 172 and an input terminal of two AND gates 174 and 176 are each connected for receiving the signal supplied by the detector circuit 164, with the second input terminals of the AND gates 174 and 176 being respectively connected for receiving the signals supplied by the AND gates 168 and 170. Additionally, a two input AND gate 178, having its input terminals connected for receiving the signals supplied by the AND gates 174 and 176, supplies a signal to a terminal 180 and to the inverting input terminals of two AND gates 182 and 184. The second input terminals of the AND gates 182 and 184 are respectively connected for receiving the signals supplied by the AND gates 174 and 176, with the AND gates 182 and 184 respectively supplying a signal to a terminal 186 and a terminal 188.

The remaining portion of the circuit depicted in FIG. 4 includes AND gates 190, 192, 194, 196 and 198 with inverting input terminals of AND gates 190 and 192 receiving a signal from the detector 164; the second input terminals of the AND gates 190 and 192 being respectively connected to the output terminal of the AND gates 168 and 170; the output terminal of the AND gates 190 and 192 being respectively connected to one input terminal of the AND gates 196 and 198 and connected to the two input terminals of the AND gate 194; and, the inverting input terminals of AND gates 196 and 198 both being both connected to the output terminal of AND gate 194.

Viewing the arrangement of FIG. 4, it can be ascertained that this circuit effectively decodes the eight possible states of the three input signals $z_1$, $z_2$ and $z_3$ by supplying a signal to one of the circuit output terminals which uniquely identifies the input state. More specifically, since each performance parameter deviation signal z effectively assumes a logic level of one when that deviation signal exceeds the threshold value of the associated detector circuit (160, 162 and 164) and a logic level zero when the deviation signal is less than such threshold value, it can be seen that none of the circuit output terminals supplies a logical one when all three deviation signals ($z_1$, $z_2$ and $z_3$) are less than the associated threshold values; the terminal 202 supplies a logical one signal when only $z_1$ exceeds its threshold value; the output terminal 204 supplies a logical one signal when only $z_2$ exceeds its threshold level; and, the output terminal 206 supplies a logical one signal when only $z_3$ exceeds its threshold. When two of the three signals $z_1$, $z_2$ and $z_3$ exceed their threshold values and the third signal is within its threshold value, the output terminal 200 supplies a logical one when the excessive signals are $z_1$ and $z_2$; the terminal 188 supplies a logical one when the signals $z_2$ and $z_3$ are excessive; and, the terminal 186 supplies a logical one when the signals $z_1$ and $z_3$ are excessive. Additionally, if all three signals $z_1$, $z_2$ and $z_3$ exceed their respective thresholds, the terminal 180 supplies a logical one signal.

Since the signals provided by the circuit of FIG. 4 indicate each possible combination of the fault states of the applied deviation signals, such signals can be utilized to activate the display devices 68 of the annunciator 66 to indicate an engine fault, a fault in one of the sensors 60 that supplies the values of a monitored dependent performance parameter, a fault within the data processor 52 and/or an indication of which engine components cause a detected engine fault. For example, in one embodiment wherein the engine pressure ratio is estimated on the basis of two different sets of independent performance parameters to provide two associated deviation signals and fuel flow is estimated to provide the third dependent performance parameter, the circuit of FIG. 4 is connected such that when only one of the deviation signals exceeds its threshold value, a fault within the portion of the data processor unit 52 that supplies the simulation of the associated dependent performance parameter is indicated; when two of the deviation signals exceed their threshold levels, a fault within a particular one of three system sensors is indicated; and, when all three deviation signals exceed their threshold values, an engine fault is indicated.

FIG. 5 is exemplary of the previously mentioned variety of circuit arrangements which can be utilized in embodying the trend logic 72 of FIG. 1. In the arrangement depicted in FIG. 5, an estimate of the engine operating time which remains before engine maintenance should be undertaken is provided by obtaining the positive real solution of the quadratic trend estimate $b_2T^2+b_1T+b_0$ with respect to a limit L (where L reflects the maximum allowable deviation of the monitored dependent performance parameter that is associated with the trending coefficients $b_0$, $b_1$ and $b_2$).

Referring more specifically to FIG. 5, the current value of the limit L (which is stored in a register 210) is subtracted from the current value of the coefficient $b_0$ (supplied by a memory register 212) within a subtractor circuit 214, with the difference signal being supplied to a multiplier 216. The multiplier 216 also receives an input signal representative of the scalar value 4 (from a latch circuit or read only memory register 218) and a signal representative of the current value of the coefficient $b_2$ (from a memory register 220) to supply a signal equal to the product of these three input terminals to the subtractive input terminal of a subtractor 222. The additive input terminal of the subtractor 222 is supplied a signal representative of the square of the coefficient $b_1$ by a multiplier 224 having both input terminals thereof connected to a memory register 226 which holds the current value of $b_1$. The current value of $b_1$ is also supplied to one input terminal of a subtractor 228 having its additive input terminal connected to a square root unit 230 which supplies a signal proportional to the square root of the signal supplied by the subtractor 222. The signal supplied by the adder 228 is divided within divider 232 by a signal representative of $2b_2$, which is supplied by a multiplier 234 having one input terminal connected to the memory register 220 and a second input terminal connected to a latch or read only memory register 236 that contains the scalar 2.

Examining this portion of the arrangement of FIG. 5, it can be seen that the signal provided by the divider 232 is representative of the positive real solution of the expression $b_2T^2+b_1T+b_0-L=0$, which provides an estimate of the time T at which the monitored dependent performance parameter will reach the limit L. To convert this signal into the estimated amount of operating time that remains before the limit L is reached, the system sampling interval $T_s$ (stored in a register 238) is multiplied within a multiplier 242 by the number of times the trend estimation sequence has been performed (stored in a latch 240) and the resulting signal is subtracted from the signal supplied by the divider 232 within a subtractor 244. As is indicated in FIG. 5, this signal can be displayed on a suitable display device 86 of the annunciator unit 66 (FIG. 1) to provide the aircraft crew and maintenance personnel with an indication of the estimated time remaining until the deviation in the monitored performance parameter reaches the limit L.

Figure 6:
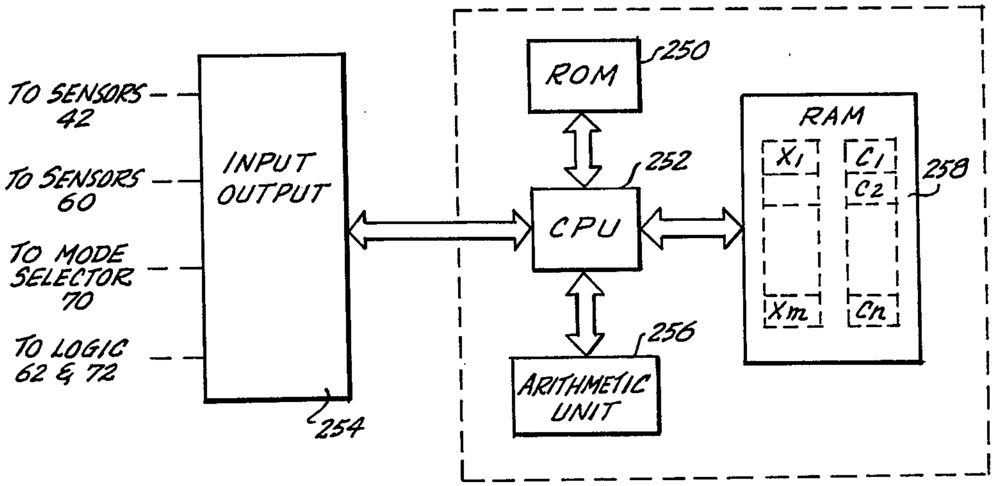
FIG. 6 is a block diagram of sequential digital apparatus, such as a programmable digital computer or microprocessor circuit which can be utilized in various embodiments of the invention to realize the coefficient estimator and/or the electronic modeling depicted in FIG. 1; and, FIG. 7 is a flow chart which illustrates typical programming of the digital computer or microprocessor of FIG. 6 for use in realizing electronic modeling and coefficient estimation in an embodiment of this invention.

In embodiments of this invention in which a large number of dependent performance parameters are to be monitored and/or a relatively large number of independent performance parameters are to be utilized in order to provide high accuracy performance monitoring, the digital processor 52 of FIG. 1 is often preferably realized by a programmable computer. In this respect, computers suitable for use in this invention are not limited to relatively sophisticated computers that are programmed by conventional software techniques, but include computing apparatus commonly identified as microprocessor units which are commercially available in integrated circuit form. As is known in the art, such a microprocessor (depicted in block diagram form in FIG. 6) can be programmed with operating instructions and nonvolatile data by storing such information in a read only memory unit (ROM) 250. During operation, a central processing unit (CPU) 252 accesses the required system input signals from a conventional input/output unit 254 in accordance with the instructions stored in the ROM 250; performs the necessary arithmetic and logic operations within an arithmetic unit 256, utilizing storage registers within a random access memory unit (RAM) 258 as a "scratch pad memory"; and, stores volatile signal information that must be temporarily retained within the RAM 258. For example, during the calibration mode of operation of an embodiment of this invention which utilizes such a microprocessor, the estimated coefficients are computed by the microprocessor unit and stored within the RAM 258 for use during operation in the system monitor mode.

In view of the previous description of the performance parameter estimation and trend estimation utilized in this invention, and in view of the hereinafter described example of a system utilizing a programmable computer to realize the parameter simulator 54, the signal difference unit 56, and the coefficient estimator 64 of the system of FIG. 1, those skilled in the art will recognize that the present invention greatly reduces system complexity so that this invention can utilize a far less sophisticated computer than those necessary in prior art airborne performance monitoring systems. Specifically, most embodiments of the invention can utilize one of the previously mentioned microprocessor arrangements or can utilize the computer within another of the aircraft's computer based systems on a time shared basis.

Although a variety of methods for programming a microprocessor or other digital computer to effect the previously described performance parameter simulation and coefficient estimation will be apparent to those skilled in the art, increased understanding of the invention can be attained and various other system advantages can be recognized by considering an exemplary operational sequence of a computer that is programmed to effect performance parameter simulation and coefficient estimation of both the performance parameter simulation coefficients and the trend coefficients. In this respect, FIG. 7 depicts a flow diagram for suitably programming such a computer with a corresponding computer program included herewith as a Technical Appendix.

Figure 7:
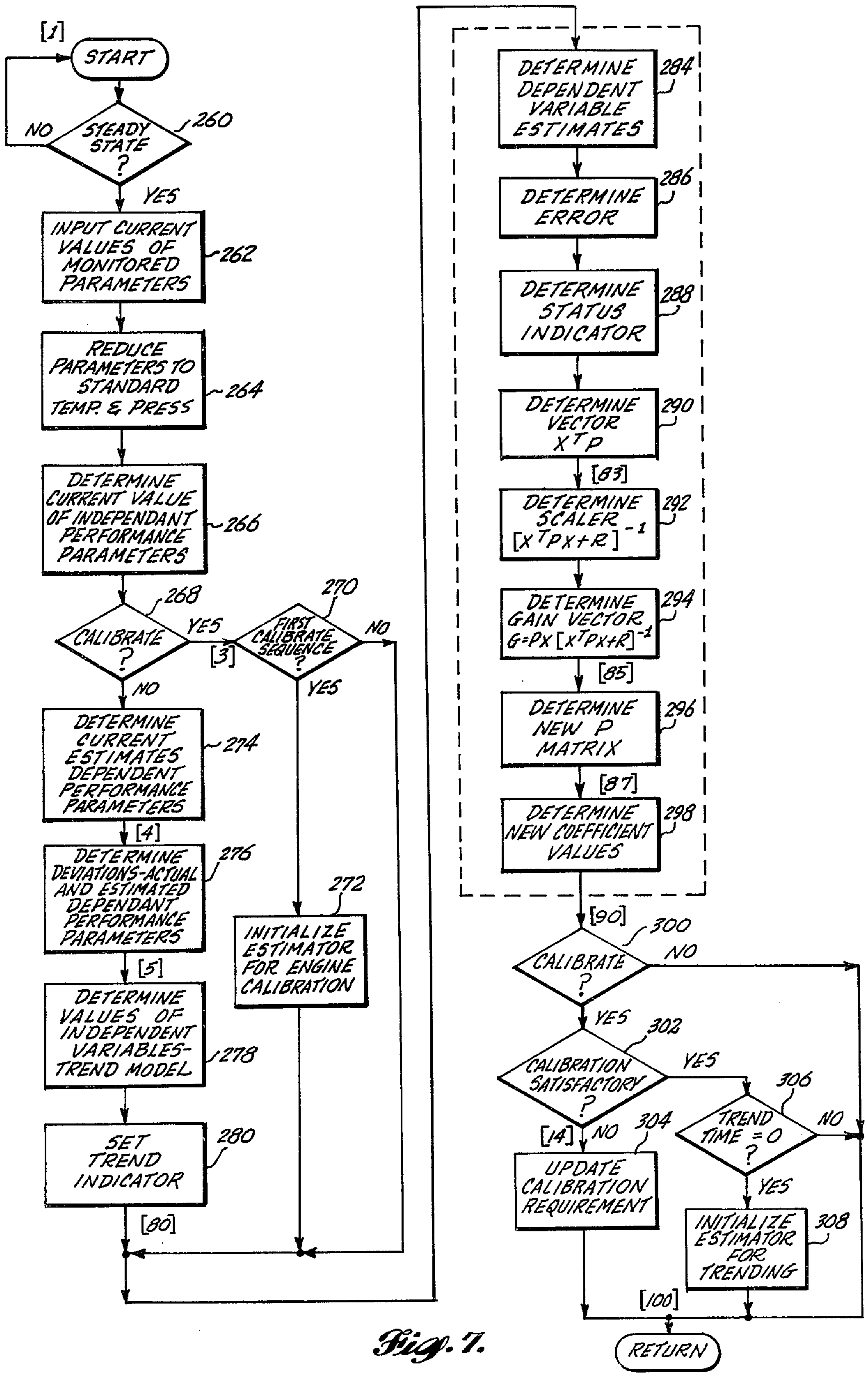

Referring to FIG. 7, each monitoring or calibration sequence begins with a logical determination of whether the monitored engine is operating in a steady state mode of operation. In practice, this determination, which is indicated at the diamond shaped decisional block 260 of FIG. 7, is generally effected by testing the value of a signal that is supplied to the digital processor (in this embodiment of the invention a programmable computer or microprocessor circuit) by another component of the monitoring system. For example, as previously described, the steady state sensor 78 of the system arrangement depicted in FIG. 1 supplies a signal which is equal to a logical zero when the monitored engine is operating in a steady state condition and is equal to a logical one during transient engine operation. In such a case, the value of this signal is utilized in a branching command to cause the data processor to continue through the operating sequence during steady state engine operation and to return to the "start" condition during periods of transient engine operation. Thus, during periods of transient engine operation, the digital processor tests the signals supplied by the system steady state sensor once during each system sampling interval and initiates estimation of the monitored dependent performance parameters (monitor mode) or estimation of the simulation coefficients (calibrate mode) as soon as steady state engine operation is attained.

As is indicated by the block 262 of FIG. 7, if the monitored engine is operating in a steady state condition, the current value of monitored system parameters, including both the dependent performance parameters and those engine performance parameters and systems signals that are utilized in forming the independent performance parameters, are determined. For example, with respect to the block diagram of FIG. 6, such signals are provided to the digital processor via the input/output unit 254 and stored in memory registers of the RAM 258. Next, as is indicated at block 264 of FIG. 7, various ones of the monitored dependent performance parameters are normalized or reduced with respect to pressure and temperature. For example, as previously mentioned, various engine temperatures and rotational speeds of a gas turbine engine being monitored are conventionally normalized relative to sea level pressure (14.7 PSI) and a temperature of 518.7° R. The current values of the independent performance parameters are then determined (as indicated at block 266) in accordance with the electronic simulation model that is employed in the particular embodiment of the invention under consideration. As previously described, a set of suitable independent performance parameters for each monitored dependent performance parameter is determined by linear regression analysis of previously available operating data pertaining to the type of engine being monitored and consists of parameters that are the product of various engine performance parameters (and other system signals), rational, real powers of the monitored system signals, and/or scalar values. A specific example of suitable dependent and independent performance parameters for use in monitoring a twin spool, high bypass engine is set forth in the computer program of the technical appendix and will be discussed hereinafter.

Having determined current values of the dependent and independent performance parameters, the data processor then determines whether the system is being operated in the calibrate mode or the monitor mode. This determination, indicated at block 268 of FIG. 7, is a branching operation dependent on the value of a system signal that is a logical one level when one of the two modes of operation is selected and is at a logical level zero when the system is operated in the other mode. Such a signal is supplied by the mode selector 70 of FIG. 1 and, with respect to the previously described embodiments of the invention, the branching operation initiated by this signal effectively realizes the switch 74 of FIG. 1. If the system is operating in the calibrate mode to determine the set of simulation coefficients that distinguish the particular engine being monitored from other engines of the same type, the digital processor proceeds to the decisional block 270 to determine whether the present operational sequence is the first sequence of the calibrate mode. In this respect, the hereinafter described example computer program utilizes a count index that is incremented during each operational sequence to continuously provide an indication of the number of operational sequences that have been effected (i.e., K in equation 1). Alternatively, in embodiments of the invention that utilize the arrangements of FIG. 2 and/or FIG. 3, a conventional digital counter circuit can be included in the system arrangement.

If the digital processor is in the first operational sequence of the calibrate mode, the coefficient estimator is initialized for determination of the simulation coefficients by establishing the initial values for the P matrix utilized in the previously described Kalman digital filtering (indicated in the block 272 of FIG. 7). Following the initialization of the coefficient estimation, the data processor returns to the operational sequence depicted in FIG. 7 at a point denoted as "[80]" in FIG. 7. On the other hand, if it is determined that it is not the first operational sequence of the calibrate mode (block 270), the initialization of the estimation coefficients is effectively skipped and the data processor sequences to the point [80]. It should be noted that the point [80] and other numerals enclosed in brackets in FIG. 7 are not only utilized in order to identify various points within the operational sequence of FIG. 7, but each such numeral identifies a corresponding instruction "address" within the hereinafter described computer program. Accordingly, such numerals are useful in relating the operational sequence of FIG. 7 to the example computer program of the Technical Appendix.

If it is determined that the system is not operating in the calibrate mode (decisional block 268 of FIG. 7), the system is operating in the monitor mode and, as is indicated at block 274, the digital processor proceeds to compute the values of each of the monitored dependent performance parameters in accordance with the previously described mathematical expression $$\hat{y}_j = \sum_{i=1}^{m} \hat{c}_i x_i$$

where j=1, 2, . . . , n. Each estimated value of a dependent performance parameter is then subtracted from the current measured value of the corresponding parameter to determine the previously described deviation signals (effected at block 276 of FIG. 7). As previously mentioned, the deviation signals can be the difference between the current actual value and the current estimate of a dependent performance parameter, or can be other conventional quantities involving this difference. For example, in the example computer program of the Technical Appendix, conventional percent point of deviation is utilized wherein each deviation signal is equal to the difference between the actual and estimated values multiplied by 100 and divided by the actual value. Regardless of the manner in which the deviation signals are defined, the data processor supplies these signals to appropriate components of the monitoring system such as the fault logic 62 of FIG. 1. Alternatively, in embodiments of the invention which utilize the data processor to effect a portion or all of the required fault logic, the data processor stores the deviation signals (e.g., in RAM 258 of FIG. 6) for future use.

At this point of the operational sequence of FIG. 7, it can be realized that the data processor has effected the portion of the monitoring system operation described relative to the parameter simulator 54 and difference unit 56 of the arrangements that are depicted in FIGS. 1 and 2.

Following the determination of the deviation signals, the data processor determines the current values of the independent variables of the trending model utilized in the practice of this invention. In particular, and with reference to Equation 2, the data processor determines the current value of $T^q$ for q=0, 1, . . . , r and stores such values in memory for use during the estimation of the current trend coefficients. In this operation, which is indicated at block 278 of FIG. 7, the data processor can compute the actual values of $T^q$, or since $T=KT_s$, where K indicates the number of sequential estimations of the trend coefficients which have been performed and $T_s$ is the system sampling period, the value of $K^q$ can be utilized. Such operation is simply a transformation of the time variable and is utilized in the computer program of the technical appendix.

Next, and as indicated at block 280 of FIG. 7, the data processor is prepared for determining current estimates of the trend coefficients ($b^q$ in Equation 2) that are associated with each of the monitored dependent performance parameters. More specifically, since the operational sequence of FIG. 7 utilizes the same operational steps to determine performance parameter simulation coefficients during operation in the system calibration mode and to determine trend coefficients during operation in the system monitor mode, it is necessary to utilize indicators or "flags" which control the operation of the data processor to reflect certain differences in the determination of simulation coefficients and the determination of trend coefficients. For example, and as previously mentioned, the independent variables utilized in determining the performance parameter estimation coefficients are the independent engine performance parameters whereas the independent variables in trend estimation are powers of the variable time ($T^q$ in Equation 2). These indicators or flags are established such that if the operational sequence proceeds through the portion thereof that is indicated as block 280 in FIG. 7, the data processor will be prepared for determining trend coefficients when it reaches point [80] of the sequence. On the other hand, if the system is operating in the calibrate mode, the data processor will reach sequence point [80] via the portions of the operational sequence associated with block 270 in FIG. 7 and the data processor will be prepared for the determination of performance parameter simulation coefficients.

In determining the trend coefficients (operation in the monitor mode) and the simulation coefficients (operation in the calibrate mode), the data processor first determines the current estimated value of each monitored dependent performance parameter (indicated at block 284 of FIG. 7) and determines the difference or deviation between the actual value of each monitored performance parameter and the estimated value (indicated at block 286 of FIG. 7). In particular, the data processor utilizes the previously mentioned indicators to initiate a series of operations that provide a projected estimate of each dependent performance parameter which is equal to $$\sum_{i=1}^{m} \hat{c}_i(k-1)\, x_i(k)$$

when the system operates in the calibrate mode and provide an estimate of each dependent performance parameter which is equal to $$\sum_{q=0}^{r} b^q(k-1)\, T^q(k)$$

when the system operates in the monitor mode. Regardless of whether the system is operating in the monitor mode or the calibrate mode, the estimated value of each dependent performance parameter is subtracted from the actual value of that performance parameter to supply the associated deviation signals. As is indicated at block 288 of FIG. 7, the data processor next determines the current values of one or more calibration status indicators $V_j$ for each of the monitored dependent performance parameters. Each indicator is indicative of the current estimation accuracy relative to an associated performance statistic (e.g., the previously described estimate of the modeling error variance) and, when the system is operating in the calibrate mode, is utilized near the end of the sequence of FIG. 7 to cause the data processor to recycle through the sequence to again estimate the performance parameter coefficients until the desired estimation accuracy has been achieved, i.e., performance parameter estimation coefficients are effected which adequately describe the engine being monitored. Additionally, during operation in the monitor mode, such a variance indicator can be utilized as the previously mentioned "measure of confidence" to indicate that the present values of the trend coefficients are reliable indications of engine condition.

Next, as is indicated at block 290 of FIG. 7, the data processor determines the values of the elements within the vector $X_K^T P_{K-1}$ of the digital filtering or estimation Equation 1-B. During this portion of the operational sequence, the necessary values of the P matrix are obtained from the system memory (e.g., RAM 258 of FIG. 6). Since, as previously described, the determination of trending coefficients during system operation in the monitor mode and the determination of engine parameter estimation coefficients when the system operates in the calibration mode are mutually exclusive events, it can be recognized that only a single set of n P matrices need be stored in the system memory (e.g., RAM 258 of FIG. 6), with the previously mentioned indicators or flags causing the data processor to access the appropriate P matrix.

Upon determining the current value of each element of the vector $X^T P$, the data processor is sequenced to determine the value of the scalar $[K_K^T P_{K-1} X_K + R]^{-1}$ of Equation 1-B (indicated at block 298 of FIG. 7) and determines the values of the filter gain vector G of Equation 1-B (indicated at block 294). During this portion of the operational sequence, the digital processor utilizes the previously mentioned indicators or flags to access the elements of X vector and the scalars R (within the system memory or RAM 258) that are appropriate to the coefficient estimation being performed, i.e., operation of the system in the calibrate mode to determine performance parameter simulation coefficients or operation of the system in the monitor mode to determine the trend coefficients. As is indicated at block 296 of FIG. 7, the data processor is then sequenced to determine a new P matrix in accordance with Equation 1-C. This new P matrix is loaded into the system memory to replace the P matrix utilized in the present operational sequence and therefor becomes the P matrix for the next operational sequence of the data processor.

Having determined the necessary filter gain constants, the data processor then determines the new or current estimated values of the coefficients for each of the monitored dependent performance parameters (indicated at block 298 of FIG. 7) in accordance with Equation 1-A, and replaces the previously stored coefficient values with the newly computed values.

At this point, it can be recognized that the portion of the operational sequence of FIG. 7 which includes block 284 through block 298 effectively realizes the coefficient estimator 64 of FIG. 1. In particular, it can be recognized that with respect to FIG. 3, the portion of the operational sequence which includes blocks 290 through 294 realizes the arrangement depicted in FIG. 3A; the portion of the sequence indicated at block 296 realizes the arrangement depicted in FIG. 3C; and, the portion of the sequence indicated at block 298 effectively realizes the arrangement depicted in FIG. 3B.

Having obtained current estimates of the trend coefficients (when the system is operating in the monitor mode) or current estimates of the performance parameter estimation coefficients (when the system is operting in the calibrate mode), the data processor then again determines the operational mode of the monitoring system (indicated at decisional block 300). This determination is made in the manner described relative to decisional block 268 and institutes a branching operation which causes the digital processor to return to the beginning of the sequence of FIG. 7 (via sequence point [100]) if the system is being operated in the monitor mode and causes the digital processor to initiate the portion of the operational sequence denoted at block 302 of FIG. 7 when the system is being operated in the calibrate mode.

In the portion of the operational sequence indicated at block 302, the current value of each status indicator $V_j$ (determined during the portion of the operational sequence denoted as block 288), is compared to a predetermined limit value to determine whether the present performance parameter coefficients properly characterize the engine to be monitored, i.e., determine whether the calibration mode is complete. Generally, the indicated branching operation is effected by subtracting the predetermined limits from the variance indicators and testing the differences. If the differences are all not less than zero, the calibration mode is not complete and the data processor proceeds to update or modify the parameters of the status indicator determination made at block 288 of FIG. 7 for the next operational sequence of the data processor. More specifically, to detect satisfactory convergence of the digital filtering effected during the calibration mode, it is generally advantageous to determine current statistical properties of the estimation error between each monitored performance parameter and the estimated value (block 286 of FIG. 7) and/or the coefficient covariance matrix P (block 296). The results of these determinations are then utilized in the decisional operation indicated at block 302. This technique is exemplified by the error variance and trace (P) indicators utilized in the computer program of the Technical Appendix. Once the status indicator has been modified or updated, the digital processor sequences to the point 100 and, since the calibration mode is not complete, begins another operational sequence.

If it is determined at the portion of the operational sequence identified as block 302 that the calibration mode is complete, the digital processor initiates the portion of the operational sequence denoted at block 306 to determine whether it is necessary to initialize the data processor for the estimation of trend coefficients during the next system monitoring interval. More specifically, and as described relative to filter Equations 1-A through 1-C, if the system has not previously operated in the monitoring mode with respect to the gas turbine engine presently being monitored, the initial values of the elements within the P matrix must be established for use in estimating a trend coefficient during the first operational sequence of the data processor. This operation is effected by the portion of the sequence of FIG. 7 denoted as block 308, with the data processor loading the initial values of the P matrix into the previously mentioned portion of the system storage allotted to the calibration P matrix and advancing to point 100 to await the initiation of the next operational sequence. If it is determined during the portion of the sequence denoted by the decisional block 306 that the system has previously been operated in the monitoring mode to establish estimated values of the trend coefficients, the data processor sequences directly to point 100 to await the start of the next system monitoring sequence.

The computer program of the Technical Appendix, which is written in the programming language "FORTRAN IV-PLUS", not only provides an example of a program which achieves the operating sequence of FIG. 7, but as shall become apparent upon fully understanding this program, also provides further information with respect to several previously mentioned aspects and advantages of the invention. Further, such a computer program is useful in utilizing an embodiment of the invention which employs a microprocessor instead of a computer that is programmed through software techniques. In this regard, a variety of conventional compilers are available for converting such a computer program into a programming language that specifically indicates the interconnections and configuration of a functionally equivalent microprocessor system.

In the conventional manner, each statement within the computer program of the Technical Appendix includes a line number (a four digit number in the leftmost columns of field); can include an "instruction address" a one to three digit number in the next field that is utilized, for example, to represent appropriate storage addresses in branching and loop operations; and, includes an arithmetic or logic statement. Further, various "comments" which are of no computational or logical consequence are included to provide programming information, such comments being identified by a "C" which is located between the field containing the line numbers and the field containing the instruction addresses. With this information in mind and recognizing that the disclosed computer program utilizes a sequence of scalar arithmetic operations to effect the matrix operations described relative to FIG. 7, those skilled in the art can easily ascertain the relationship between the computer program of the Technical Appendix and the operational sequence depicted in FIG. 7.

More specifically, the computer program begins at line 1 with a "dimensioning statement" that effectively instructs the computer as to the amount of storage required for various variables that are utilized during each operational sequence. For example, in the computer program of the Technical Appendix, the variable Z represents the monitored dependent performance parameters with five parameters being monitored and the variable XT represents independent performance parameters with 33 various combinations of easily monitored system signals being utilized in he embodiment of the invention that employs the disclosed computer program.

Lines 2–9 establish initial values of the indicated variables for use during the first operational sequence of the system. For example, at line 3, the 115 coefficient values that are utilized as simulation coefficients and trend coefficients are initially established equal to zero. As previously described, because of the accuracy of the electronic simulation utilized in this invention, inital coefficient values of zero are generally satisfactory and suitable values of the simulation coefficients which characterize the engine being monitored relative to other engines of the same type are derived during operation in the system calibrate mode.

With suitable dimensioning of the variables and initial values having been established, the operational sequence begins at line 10 (instruction address 1) with a "continue" instruction which corresponds to the "start" block of FIG. 7. As was described relative to block 260 of FIG. 7, the initial logical operation is a determination of whether the monitored engine is in steady state operation, with the disclosed computer program utilizing the variable IM to denote the system signal which indicates steady state or transient engine operation (line 11 of the program). Next, at lines 12–54, the current values of the monitored system signals are determined (e.g., read into storage), various signals are normalized to form the desired set of dependent performance parameters (Z), the current value of the independent performance parameters (XT) are determined and computational indices J1 and J2 are established which control operation of the computer during subsequent portions of the operational sequence.

More specifically, as is indicated by the program comments included between lines 11 and 12, the embodiment of the invention in which the disclosed computer program is utilized uses ten easily monitored engine parameters and air data signals as a basis for five dependent performance parameters (Z(1), I=1, 2, . . . , 5) and as a basis for 33 independent performance parameters (XT(I), I=1, 2, . . . , 33). Included in these ten monitored system signals are the engine parameters, EPR (engine pressure ratio), fuel flow (W), EGT (exhaust gas temperature), N1 (rotational speed of the low pressure compressor or fan stage), N2 (rotational speed of the high pressure compressor), TT2 (temperature at the low pressure compressor stage), and PT2 (pressure at the low pressure compressor stage). Further, air data signals representing the velocity and altitude of the aircraft (Mach and ALT) are utilized along with the engine thrust command signal or power level angle (PLA).

As indicated at lines 14–21, the five monitored dependent performance parameters (Z(1) through Z(5) in the program) are respectively EPR; N1/$\theta$, where $\theta$ is a normalization factor equivalent to the square root of TT2/518.7° R; N2/$\theta$; EGT/$\theta^2$; and W/(PT2/14.7 $\theta$). As is indicated at lines 22 through 54, the independent performance parameters (XT(I), I=1, 2, . . . , 33) are various constants, e.g., XT(20) is established equal to the scalar value one at line 41; are various system parameters, e.g., XT(14) is set equal to the current value of TT2 at line 35; are various rational powers of the current value of an engine system parameter, e.g., XT(16) is set equal to the square root of the aircraft Mach number at line 37; or, are products of the various engine system parameters, e.g., XT(17) is set equal to the product of the current values of TT2 and the aircraft Mach number at line 38.

As shall be described in more detail hereinafter, in an embodiment of the invention utilizing the computer program of the Technical Appendix, the first 20 independent performance parameters (XT(1) through XT(20)) are employed in the estimation of each of the first four dependent performance parameters (Z(1) through Z(4)), and the independent performance parameters XT(14) through XT(33) are employed in the estimation of the fifth dependent performance parameter Z(5).

In the manner previously described, each set of independent performance parameters that is associated with a particular dependent performance parameter is selected by statistical analysis of engine system operating data (linear regression) that relates to the type of engine being monitored so that the independent performance parameters generically characterize the type of engine to be monitored with the simulation coefficients characterizing the particular engine being monitored relative to others of the same type. In this respect, the estimation of certain ones of the dependent performance parameters utilized in the disclosed computer program such as N1 and N2 does not necessarily require use of all 20 independent performance parameters ($X_T(1)$ through $X_T(20)$) to attain the desired estimation accuracy (e.g., one percent). However, it is advantageous to utilize the same number of independent performance parameters in the estimation of each monitored dependent performance parameter in order to minimize the number of logic and arithmetic instructions required to implement the electronic simulation employed in the practice of this invention and thereby minimize computer memory requirements. Further, in situations such as that being described wherein a common set of independent performance parameters is not suitable for estimating every monitored dependent performance parameter, arranging the dependent performance parameters such that a number of independent performance parameters in one set are also utilized in another set further minimizes computer memory requirements. For example, and as previously mentioned, the twenty independent performance parameters used for the estimation of the dependent performance parameter Z(5) includes independent performance parameters Z(14) through Z(20) which are also included in the set of twenty independent performance parameters used in estimating the dependent performance parameters Z(1) through Z(4).

To cause the computer to access the appropriate set of independent performance parameters during the simulation of a particular dependent performance parameter, the computer program of the Technical Appendix includes a computational index J1 which is initially set equal to zero (line 13) to cause the computer to access the first 20 independent performance parameters (XT(1) through XT(20)) during the determination of the first four dependent performance parameters (Z1) through Z(4). As shall be more completely described, the index J1 is set equal to 13 at appropriate points of the operational sequence to cause the computer to access independent performance parameters XT(14) through XT(33) for the estimation of the independent performance parameter Z(5). Further, to utilize common programming instructions during the calibration and engine modeling and during performance trending operation, the disclosed computer program utilizes a computational index J2. This index is set equal to 20 during portions of the computational sequence in which engine modeling is being effected and is set equal to 3 during portions of the computational sequence in which engine trend information is being determined with the numerals 20 and 3 denoting the number of independent variables utilized in these two operations.

Once the current values of the independent and dependent performance parameters have been determined, the IF statement at line 55 effects the branching command indicated at block 268 of FIG. 7, with the variable IC being supplied to the computer being equal to 1 when the system is operated in the calibrate mode, e.g., the signal supplied by the system mode selector 76 in the system arrangement of FIG. 1. If the system is in the calibrate mode (IC=1), the computer sequences to the instruction address 3 (at line 72) and if the system is in the monitor mode (IC=0), the computer executes the instructions of lines 56 through 62 to determine the current estimate of each monitored performance parameter and to determine the deviation between the actual and estimated values of each dependent performance parameter.

Assuming that the system is operating in the calibrate mode (IC=1), the instruction at line 72 sets an address index J4 equal to zero, such address index causing the computer to access the proper coefficients during the digital filtering operation in which new simulation coefficients are estimated. Next, the IF statement at line 73 corresponds to the decisional block 270 of FIG. 7 and causes the computer to establish initial values of each P matrix utilized in the previously described Kalman digital filtering during the first operational sequence or iteration that is performed when the system is placed in the calibrate mode. In this respect, the IF statement of line 73 causes the computer to test the value of a computation index CK, which is set equal to zero at line 5 of the first computational sequence performed under the control of the disclosed computer program and incremented by one with each subsequent iteration. Thus, if CK is zero, the first calibration sequence is being performed and the computer initializes the P matrices. On the other hand, if CK is greater than zero, the computer sequences to line 80 to estimate the required simulation coefficients. Since a separate P matrix is associated with each of the five dependent performance parameters Z(1) through Z(5) and 20 independent performance parameters are utilized for each simulation of a dependent performance parameter, 2000 initial values are established. In this respect, although the disclosed computer program utilizes scalar operations and does not require matrix operations, it can be noted that the indexing arrangement utilized in the disclosed computer program is such that P(1) through P(100) correspond to five consecutive sets of 20 covariance values that, in turn, correspond to the first column of the five P matrices described relative to Equations 1-A through 1-C; P(101) through P(200) includes five consecutive sets of 20 covariance values that correspond to the second column of the five P matrices, etc. Thus, for example, the first column of the P matrix of Equations 1-A through 1-C that is associated with determining the appropriate coefficients (C) for simulation of Z(1) correspond to the elements P(1) through P(20) of the disclosed computer program; the second column of this P matrix corresponds to elements P(101) through P(120), . . . , and the twentieth column of this P matrix corresponds to the elements P(1901) through P(1920).

With regard to establishing each initial value P(I), I=1, 2, . . . , 2000, the disclosed computer program first sets each element equal to zero (DO loop at lines 74 and 75) and then (at lines 76 through 79) establishes a dummy variable K1 and a nested DO loop to establish each element that corresponds to a diagonal in one of the P matrices of Equations 1A through 1C equal to an initial value $P_0$, which is read into computer memory during the first operational sequence of the system (line 4 in the disclosed computer program). Thus, it can be recognized that upon completing the above-described arithmetic operations, the stored values P(0) through P(2000) constitute a stored numerical array which corresponds to five 20 by 20 matrices each having off diagonal elements equal to zero and non-zero diagonal elements equal to $P_0$. Accordingly, in terms of the corresponding matrix notation of Equations 1-A through 1-C, each initial P matrix is a positive definite matrix, which, as previously described is necessary to ensure that each successive iteration of the herein described calibration sequence will result in an improvement in the accuracy of the simulation coefficients, i.e., convergence of the coefficient estimation sequence.

With the initial values of P(1) through P(2000) established, the computer begins the estimation of the required simulation coefficients at address 80 (line 80 of the disclosed computer program) where the previously described computational index J1 is set equal to zero. Next, the computer is sequenced through a series of nested DO loops (lines 81 through 134) which cause the computer to determine a set of simulation coefficients for each of the monitored dependent performance parameters that is based on the difference between the current actual value of a monitored dependent performance parameter and the estimated value of the same dependent performance parameter that is obtained during the current iteration.

More specifically, at lines 81 through 82, the DO loop initializes the computational variables XTC to a value of zero. Next, at line 83, the DO loop index I is tested to determine whether the computer is estimating the value of one of the first four dependent performance parameters (Z(1) through Z(4)) or is estimating the value of the fifth dependent performance parameter (Z(5)). If one of the first four dependent performance parameters is being estimated, the computational index J1 is permitted to remain equal to zero in order to cause the computer to access the first 20 independent performance parameters (XT(1) through XT(20)) during the ensuing estimation calculations. On the other hand, if Z(5) is being estimated, J1 is set equal to 13 so that the computer will utilize the dependent performance parameters XT(14) through XT(33).

With the computational index J1 established to select the proper independent performance parameters and the computational variable XTC initialized at zero, the computer is sequenced through a DO loop set forth at lines 84–86 to determine the current estimated value of one of the dependent performance parameters. For example, during the first pass through the nested DO loop arrangement of lines 81 through 134, the DO loop index I is equal to one and the computer determines the estimated value of Z(1), which is temporarily stored as the computational variable XTC.

Next, as indicated at line 87 of the program, the computer determines the difference between the current value of the monitored dependent performance parameter Z(I) and the estimated value of that parameter XTC, such operation providing the difference signal generally denoted as $y-\hat{y}$ in the description of the embodiment of the invention depicted in FIGS. 1-5. One quantity that can be utilized as the status indicator described relative to block 288 of FIG. 7 is then calculated at lines 88 and 89; the indicated status indicator V(I) being numerically equal to a recursive estimate of the variance of the above-mentioned difference between the actual and estimated values of the dependent performance parameter, where C1 and C2 are scaler quantities that are initialized at lines 8 and 9 of the computer program and updated in value during each iteration of the calibration sequence (lines 140 and 141).

After determining the difference signal and the current value of the status indicator V(I), the computer accesses the 400 coefficients of error covariance within the array PC(K), K=1, 2, . . . , 2,000 that is stored in memory and loads these values into an ordered array that is held in computer working storage, such array corresponding to the $P_{K-1}$ matrix of Equations 1-A through 1-C that is associated with the particular dependent performance parameter Z(I) which was estimated at line 86. More specifically, each pass through the DO loop of lines 90 through 95 loads 20 scalar values which, in equivalent matrix notation, constitute one row of the matrix $P_{K-1}$ discussed relative to Equations 1A–1C with the value of K1 being established to denote the array index within working storage and the value of K2 being established to access the proper scalar value within the stored array PC. For example, when the first dependent performance parameter Z(1) is estimated at line 86 of the program, I is equal to one and the DO loop index L is set equal to one. Thus, as the DO loop specified at lines 92 through 95 is executed, the DO loop index M is incremented between one and 20 (the value of J2 during calibration operation) to cause the index K1 to be incremented in steps of 20 and sequence from one to 381, while simultaneously causing the index K2 to be incremented in steps of 100 and sequence between one and 1901. In view of the indexing utilized and described relative to the storage of the initial PC array at lines 74–79 of the disclosed computer program, it can be seen that, when the DO loops of lines 90–95 are executed with L equal to one, the computer loads 20 elements of the stored PC array (corresponding to the first row of the $P_{K-1}$ matrix of Equations 1-A through 1-C) as the first 20 elements of P array. Similarly, each time L is incremented at line 90, the computer loads the next 20 elements into the P array such that when the DO loop is completed (L=20), the P array is an ordered array of 400 scalar values that correspond to the entire $P_{K-1}$ array that is associated with the particular performance parameter estimated at line 86.

Next, at lines 96–100, the disclosed computer program sequences the computer through a series of scaler operations that correspond to determining the 20 element vector $X^TP$, which is indicated at block 290 of FIG. 7 and is denoted as $X^T{}_KP_{K-1}$ in Equations 1-B and 1-C. More specifically, each time the computer sequences through the DO loop of lines 96–100, one element of the PX array is calculated with the index M identifying the element being calculated and the DO loop index L being incremented from one through 20 to access the proper independent performance parameters and the proper element of the previously described P array. In this regard, an index K1 is established at line 99 which properly accesses the required element of the P array as the index L is incremented and the arithmetic statement at line 100 effectively accumulates the products of corresponding elements of the P array and the independent performance parameters within the array $X^T$ so that, each time the operation at line 100 has been completed (L=20), a scalar value corresponding to the "Mth" element of the vector of the $X^TP$ is stored as PX(M). Accordingly, when the DO loop index M has ranged between 1 and 20, 20 elements that correspond to the noted matrix operation are stored in the PX array. (Because of the "forced" symmetry of the $P_{K-1}$ matrix which will be subsequently described, the matrix operation $X^TP$ is equivalent to PX).

Next, the computer is sequenced to perform the matrix operation indicated at block 292 of FIG. 7, which corresponds to calculation of the term $[X^T{}_KP_{K-1}X_K+R]^{-1}$ in Equation 1-B. In particular, a temporary computational variable YT is initialized to zero at line 101 of the disclosed computer program and a DO loop set forth at lines 102 through 104 accumulates the 20 products of an appropriate element of PX array (element of the $X^TP$ matrix operation) multiplied by an appropriate one of the 20 independent performance parameters (element of the $X^T$ array). Following this operation, the value of CR (which corresponds to the scalar modeling error R in Equation 1-B and is loaded into computer memory at line 2 of the disclosed computer program) is added to YT and the desired scalar value is obtained by setting YT equal to the reciprocal of the sum of YT and CR (line 105 of the computer program).

Having determined a scalar value that corresponds to the matrix operation $[X^T{}_KP_{K-1}X_K+R]^{-1}$ of Equation 1-B, the computer is then sequenced to determine an array of 20 Kalman gain constants which correspond to $G_K$ in Equation 1-B and the operation denoted at block 294 of the operational sequence depicted in FIG. 7. These gain constants are determined by the DO loop set forth at lines 106 and 107 of the computer program.

Next, the computer is sequenced to determine a second type of status indicator TR(I), which corresponds to the previously mentioned matrix trace operation of the current coefficient error covariance matrix ($P_{K-1}$ in Equations 1-B and 1-C) and to update the elements of the matrix $P_K$ of Equation 1-C, which is utilized if the computer is again sequenced through the calibration sequence (i.e., if the current calibration sequence does not provide simulation coefficients of a suitable accuracy). In this respect, the status indicator TR(I), where I denotes the index of the associated dependent performance parameter Z(I), and hence a particular set of simulation coefficients, is initially set equal to zero at line 108. During each execution of the nested DO loop indexed by the variable M (line 111), each element of the term $G_KX_K{}^TP_{K-1}$ of Equation 1-C is calculated (line 114). The m·m elements of this matrix are then temporarily stored in the idle sector of the PC array to conserve computer storage. In this respect, the computer program sequences through the outer DO loop (lines 109 through 117) wherein the DO loop index L is utilized to cause the computer to update "L" row elements of the P array with each pass through the DO loop. In particular, the computational indices K1 and K2, established at lines 112 and 113, cause the computer to calculate new elements for the P array that correspond to a diagonal element of the $P_K$ matrix of Equation 1-C along with each element lying to the left of the diagonal in that particular row of the $P_K$ matrix. For example, during the first operational sequence through the DO loop of lines 109 through 117 (i.e., L=1), the computer calculates a single element P(1) which corresponds to the upper left-hand (diagonal) element of the matrix $P_K$ defined by Equation 1-C and sets the status indicator TR(1) equal to this scalar value. During the next sequence through the DO loops of lines 109 through 117 (L=2), the computer calculates two scaler values corresponding to the first and second (diagonal) element of the second row of $P_K$ and adds the scalar value that corresponds to this diagonal element to TR(I). The computational sequence continues in this manner until the computation has been completed for L=20 to thereby calculate scaler values corresponding to each diagonal element of $P_K$ and scalar values for each off diagonal element that lies to the left of the diagonal elements of the matrix $P_K$. Further, through the arithmetic statement at line 117, TR(I) is equal to the summation of all 20 diagonal elements as the DO loop sequence is completed. For convenience, the status indicator is normalized relative to the initial covariance error coefficient, $P_0$ at line 118 of the computer program.

Next, the instructions set forth at lines 119 through 125 sequence the computer to establish the value of those elements of the P array which correspond to elements of the $P_K$ matrix of Equation 1-C which lie to the right of the matrix diagonal elements. These elements are not calculated from the Kalman gain array G and the PX array, which as previously described, stores scalar values corresponding to the vector resulting from the matrix operation $X^T{}_KP_{K-1}$ of Equations 1-B and 1-C. Instead, each element of the P array that corresponds to a right-hand off-diagonal element of the $P_K$ matrix is set equal to the value of one of the left-hand off diagonal elements such that the P array corresponds to a symmetrical matrix when the DO loops of equations 119 through 125 are completed. For example, the element P (399), which corresponds to the element that lies in the 19th row and 20th column of the $P_K$ matrix, is set equal to P(380), which corresponds to the element of $P_K$ matrix that lies in the 20th row and the 19th column.

With the array P effectively holding the new $P_K$ matrix, the computer is then sequenced to calculate the new values of the simulation coefficients associated with the dependent performance parameter Z(I) (indicated at block 298 of FIG. 7 and by Equation 1). In this regard, the DO loop set forth at lines 126 through 128 of the disclosed computer program causes the computer to update those 20 simulation coefficients that are associated with the estimation of the dependent performance parameter Z(I) during operation of the system in the monitor mode.

When the new simulation coefficients have been determined, the instructions at lines 129 through 133 of the disclosed computer program cause the computer to execute a DO loop that replaces the values stored in the PC array with the scaler values contained in the matrix $P_K$ calculated during this operational sequence. The new PC elements thus correspond to the elements of the $P_{K-1}$ matrix to be utilized during the next operational sequence.

It should again be noted that operation of the computer in the above-described calibration sequence was initiated through a DO statement at line 81, which causes the computer to effectively determine a $P_K$ matrix and a new set of coefficients C for each dependent performance parameter Z(I), $I=1, 2, \ldots, 5$. Thus, when the operation is completed with the DO loop index I equal to five, the computer stores a 2,000 element PC array that is used for the five $P_{K-1}$ matrices of the next calibration sequence and stores the five sets of 20 simulation coefficients that are associated with the five dependent performance parameters Z(1) through Z(5). At this time, the "continue" command at line 134 (instruction address 90) causes the computer to sequence to the logical IF statement at line 135, to again determine whether the system is being operated in the calibrate or monitor mode.

This logical IF statement, which corresponds to block 300 of the operational sequence depicted in FIG. 7, causes the computer to sequence to the instruction at line 151 (instruction address 100) if the system is in the monitor mode (IC=0) and causes the computer to sequence to the instruction at line 136 when the system is being operated in the calibrate mode. When as described above, the system is in the calibrate mode and has just completed the estimation of a new set of simulation coefficients, the DO loop at lines 136 through 138 test each of the calibration status indicators TR(I), $I=1, 2, \ldots, 5$ to determine if the present calibration sequence has established simulation coefficients that will result in the desired system accuracy when the system is operated in the monitor mode. In this regard, each of the status indicators is compared to a limit, denoted as CSTOP, which was loaded into computer memory at lines 7 of the computer program. If the value of any of the status indicators exceeds CSTOP, the computer is sequenced through lines 139 through 142 which updates a count index CK, updates the scalar values C1 and C2 that are utilized in determining the status indicator V(I) and sequences the computer to instruction address 1 (line 10) to thereby cause the computer to re-execute the above-described calibration sequence and thereby form improved sets of coefficients.

If, on the other hand, all of the status indicators TR(I) are less than CSTOP, the simulation coefficients determined during that particular execution of the above-described calibration sequence are sufficient to ensure the desired accuracy of this system during operation in the monitor mode. This being the case, the computer is sequenced to line 143 (instruction address 10) by the instruction at line 138, which corresponds to block 306 of the operational sequence depicted in FIG. 7.

The IF statement at line 143 determines whether or not it is necessary to initialize 45 scalar values of the stored PC array that correspond to the five 3×3 matrices of covariance error coefficients utilized in the digital filtering portion of the trending sequence (operation of the system in the monitor mode). More specifically, when the system is first installed to monitor a particular engine and the calibration sequence is completed, it is then necessary to establish initial P matrices for the first operational sequence of the system monitor mode. This initialization sequence is initiated by detecting the value of a count index KT at line 143 (instruction address 10 of the disclosed computer program). Since the count index KT is set equal to zero at line 6 of the program during the first operational sequence after installation of the system for monitoring a particular engine and is incremented by one at the completion of each monitoring sequence (line 151 of the program), KT will be equal to zero only when the system has not previously operated in the monitor mode and at all times thereafter will be indicative of the period of time that the engine has been monitored.

When KT is equal to zero, the instruction at line 143 causes the mode indicator IC to be set equal to zero (line 144) to indicate that the calibration sequence is complete and that the ensuing computer operation should be performed in the monitor mode. Further, in the manner described relative to initialization of the PC array during operation of the system in the calibrate mode, the DO loop of lines 145 through 150 causes the first 45 elements of the stored PC array to correspond to five 3×3 matrices having diagonal elements equal to $P_0$ and off diagonal elements equal to zero. In this regard, it can be noted that since operation of the system in the calibrate and monitor modes are mutually exclusive events, computer storage requirements are minimized by storing the elements of the trend estimation error covariants matrix (monitor mode) in the register locations utilized for the first 45 elements of the calibrate sequence PC array.

With the initial values of a PC array suitable for the trending portion of the system operation in the monitor mode established, the computer increments the count index KT (line 151) and sequences the computer to instruction address 1 (line 10) to thereby cause the computer to cycle through one operating sequence of the monitor mode.

Like the previously described operation in the calibrate mode, the computer begins an operational sequence of the monitoring mode by accepting new values of the monitored system parameters and calculating the corresponding current values of the dependent performance parameters (Z(1) through Z(5)) and the independent performance parameters (XT(1) through XT(33)) in accordance with the program instructions of lines 10–54. Next, since the system is operating in the monitoring mode (IC=0), the instruction at line 55 does not direct the computer through the above-described calibration routine, but sequences the computer through the instructions set forth at lines 57 through 62 to determine the difference between the current value of each dependent performance parameter Z(I), I=1, 2, . . . , 5 and the corresponding current estimate of each dependent performance parameter Y(I), I=1, 2, . . . , 5 (determined at line 61 of the program). At the completion of this portion of the monitoring sequence, the Z array contains scalar values corresponding to $y-\hat{y}$ of the embodiments of the invention described relative to FIGS. 1-5 for each of the five dependent performance parameters, such values being made available to the system fault logic (e.g., fault logic 62 of the system arrangement of FIG. 1) for the previously described signal processing that produces the system fault indications.

The computer is then sequenced to effect the previously described parameter trending estimation in which the trending coefficients of a quadratic estimate of the time dependent behavior of each monitored dependent performance parameter are estimated. As previously described, when a quadratic polynomial trending estimation is utilized, the system determines the coefficients $b_q$ for an estimate mathematically represented by $y-\hat{y}=b_0+b_1t+b_2t^2$.

More specifically, at lines 63-70, the disclosed computer program causes the computer to calculate the current value of the independent trend variable (unity, KT and $KT^2$) and load the appropriate values of the independent trend variables into computer memory. Since the current values of the independent performance parameters which are stored in the XT array are no longer required, the independent trend variables are stored as elements 1-3 and elements 14-16 of the XT array to further reduce computer storage requirements. When the independent trend variables have been loaded into the XT array (line 68), the computer is sequenced to set the previously described computation indices J4 and J2 respectively equal to 100 and 3 to cause the computer to properly dimension the instruction statements utilized during the trend coefficient estimation sequence and to access the proper stored parameters during this estimation sequence.

The computer is then sequenced to instruction address 80 (line 80 of the program) to form the previously described digital filtering sequence and estimate the current values of the trend coefficients. During this digital filtering sequence, the computer sequences through the instructions of lines 80 through 134 to thereby determine a set of three trend coefficients ($b_2$, $b_1$ and $b_0$ in terms of the previously described mathematical representation of the trending estimation) for each of the five independent performance parameters Z(I), I=1, 2, . . . , 5. These 45 trend coefficients are then stored as elements 101 through 145 of the coefficient array C and are supplied to the system trend logic (e.g., logic 72 in the system of FIG. 1) for activating the system trend displays (e.g., annunciator unit 66 of FIG. 1).

Unless the system is switched to the calibrate mode for recalibration of the system, each time a monitoring sequence is completed, the indicator IC is equal to zero and the count index KT is greater than one. Thus, the computer is sequenced from the instruction at line 135 to instruction address 100 (line 151 of the program), which increases the count index KT and sequences the computer to instruction address 1 (at line 10) for the start of the nextmost monitoring sequence.

TECHNICAL APPENDIX

As previously described, the following computer program is one example of a program that can be utilized in an embodiment of the invention which employs a programmable digital computer as the system digital processing unit.

```
     C        ON-LINE ENGINE CALIBRATION/TREND PROGRAM
0001          DIMENSION Z(5),XT(33),C(115),Y(5),S(10),G(20),P(400),
            1           PC(2000),PX(20),CR(5),V(5),TR(5)
0002          DATA CR/5*100./
0003          DATA C/115*0./
0004          PO=1.E6
0005          CK=1.
0006          KT=0
0007          CSTOP=1.
0008          C1=1.
0009          C2=0.
0010        1 CONTINUE
     C        READ CONTROL INPUTS,IM,IC
0011          IF (IM.EQ.0) GO TO 1
     C        READ ENGINE AND AIR DATA
     C        S(1)=EPR
     C        S(2)=FUEL FLOW . . . LB/HR
     C        S(3)=EGT . . . . . . . . . . DEG.R.
     C        S(4)=N1 . . . . . . . . . . . RPM
     C        S(5)=N2 . . . . . . . . . . . RPM
     C        S(6)=TT2 . . . . . . . . . . DEG.R.
     C        S(7)=PLA . . . . . . . . . . DEG.ROT.
     C        S(8)=PT2 . . . . . . . . . . PSI
     C        S(9)=MACH
     C        S(10)=ALT . . . . . . . . . FT.
     C        CALCULATE ENGINE MODEL INDEPENDENT VARIABLES
0012          J2=20
0013          J1=0
0014          Z(1)=S(1)
0015          CT=S(6)/518.7
0016          CTR=SQRT(CT)
0017          CP=S(8)/14.7
0018          Z(2)=S(4)/CTR
0019          Z(3)=S(5)/CTR
0020          Z(4)=S(3)/CT
0021          Z(5)=S(2)/CP/CTR
```

-continued

TECHNICAL APPENDIX

As previously described, the following computer program is one example of a program that can be utilized in an embodiment of the invention which employs a programmable digital computer as the system digital processing unit.

```
      XT(1)=Z(5)
      XT(2)=SQRT(Z(5))
      XT(3)=XT(1)*XT(1)
      XT(4)=XT(3)*XT(2)
      XT(5)=XT(1)*XT(3)
      XT(6)=XT(5)*XT(2)
      XT(7)=XT(1)*XT(2)
      XT(8)=XT(1)*S(6)
      XT(9)=XT(1)*S(9)
      XT(10)=XT(2)*S(9)
      XT(11)=XT(7)*S(9)
      XT(12)=XT(1)*SQRT(S(6))
      XT(13)=XT(3)*S(9)
      XT(14)=S(6)
      XT(15)=S(9)
      XT(16)=SQRT(S(9))
      XT(17)=S(6)*S(9)
      XT(18)=S(10)
      XT(19)=S(6)*S(9)**2
      XT(20)=1.
      XT(21)=S(7)
      XT(22)=SQRT(S(7))
      XT(23)=S(7)*XT(22)
      XT(24)=S(7)**2
      XT(25)=XT(24)*XT(22)
      XT(26)=XT(24)*XT(21)
      XT(27)=XT(14)*XT(21)
      XT(28)=XT(14)*XT(24)
      XT(29)=XT(14)**3
      XT(30)=XT(14)*XT(22)
      XT(31)=XT(22)*SQRT(XT(14))
      XT(32)=XT(14)*XT(26)
      XT(33)=XT(21)*XT(29)
      IF(IC.EQ.1) GO TO 3
      DO 5 I=1,5
C     ENGINE PERFORMANCE DEVIATION CALCULATIONS
      Y(I)=0.
      IF(I.EQ.5)J1=13
      DO 4 L=1,J2
      K1=(I-1)*J2+L
    4 Y(I)=XT(L+J1)*C(K1)+Y(I)
    5 Z(I)=(Z(I)-Y(I))*100./Z(I)
C     PARAMETER TREND MODEL
      XT(1)=1.
      XT(2)=KT
      XT(3)=KT*KT
      XT(14)=XT(1)
      XT(15)=XT(2)
      XT(16)=XT(3)
      J4=100
      J2=3
      GO TO 80
    3 J4=0
      IF(CK.GT.1.) GO TO 80
C     INITIALIZE ESTIMATOR FOR CALIBRATION
      DO 6 I=1,2000
    6 PC(I)=0.
      DO 7 I=1,J2
      DO 7 L=1,5
      K1=(I-1)*100+(L-1)*K2+I
    7 PC(K1)=PO
C       ESTIMATOR ROUTINE
   80 J1=0
      DO 90 I=1,5
      XTC=0.
      IF(I.EQ.5)J1=13
      DO 81 L=1,J2
      K1=(I-1)*J2+L+J4
   81 XTC=XT(L+J1)*C(K1)+XTC
      GRAD=Z(I)-XTC
      YT=GRAD*GRAD
      V(I)=C1*YT+V(I)*C2
      DO 82 L=1,J2
      J3=(I-1)*J2+L
      DO 82 M=1,J2
      K1=(M-1)*J2+L
      K2=(M-1)*J2*5+J3
   82 P(KI)=PC(K2)
```

-continued

TECHNICAL APPENDIX

As previously described, the following computer program is one example of a program that can be utilized in an embodiment of the invention which employs a programmable digital computer as the system digital processing unit.

```
      DO 83 M=1,J2
      PX(M)=0.
      DO 83 L=1,J2
      K1=(L-1)+J2+M
   83 PX(M)=P(K1)*XT(L+J1)+PX(M)
      YT=0.
      DO 84 L=1,J2
      K1=(I-1)*J2+L
   84 YT=PX(L)*XT(L+J1)+YT
      YT=1./(YT+CR(1))
      DO 85 L=1,J2
   85 G(L)=PX(L)*YT
      TR(I)=0.
      DO 86 L=1,J2
      J3=(I-1)*J2+L
      DO 89 M=1,L
      K1=(M-1)*J2+L
      K2=(M-1)*J2*5+J3
      PC(K2)=G(L)*PX(M)
   89 P(K1)=P(K1)-PC(K2)
      K1=(L-1)*J2+L
   86 TR(I)=TR(1)+P(K1)
      TR(I)=TR(I)/PO
      J2M1=J2-1
      DO 87 L=1,J2M1
      LP1=L+1
      DO 87 M=LP1,J2
      K1=(M-1)*J2+L
      K2=(L-1)*J2+M
   87 P(K1)=P(K2)
      DO 88 L=1,J2
      K1=(I-1)+J2+L+J4
      C(K1)=C(K1)+G(L)+GRAD
      J3=(I-1)*J2+L
      DO 88 M=1,J2
      K1=(M-1)*J2*5+J3
      K2=(M-1)*J2+L
   88 PC(K1)=P(K2)
   90 CONTINUE
      IF(IC.EQ.0) GO TO 100
      DO 13 I=1,5
   13 IF(TR(I).GT.CSTOP)GO TO 14
      GO TO 10
   14 CK=CK+1.
      C1=1./CK
      C2=(CK-1.)*C1
      GO TO 1
   10 IF(KT.GT.0)GO TO 100
C        INITIALIZE ESTIMATOR FOR TRENDING
      IC=0
      DO 11 I=1,45
   11 PC(I)=0.
      DO 12 I=1,3
      DO 12 L=1,5
      K1=(I-1)*15+(L-1)*3+I
   12 PC(K1)=PO
  100 KT=KT+1
      GO TO 1
  999 STOP
      END
```

The embodiments of the invention in which an exclusive property or privilege is claimed are defined as follows:

1. A system for monitoring at least one performance parameter of a gas turbine engine installation comprising:

first sensor means for supplying a signal representative of the current value of each monitored performance parameter;

second sensor means for supplying a first plurality of signals representative of the current values of an associated plurality of operating parameters of the engine installation being monitored, said plurality of signals being selected so that a signal $$y = \sum_{i=1}^{m} x_i c_i$$

provides a current estimate of each monitored performance parameter where y denotes the estimated value of each monitored performance parameter, $x_i$ denotes a series of m independent performance parameters each having a current value dependent on the current value of selected ones of said plurality of signals supplied by said second sensor means and $c_i$ denotes a set of m scalar simulation coefficients;

first signal processing means responsive to said plurality of signals supplied by said second sensor means, said first signal processing means including means for supplying a second plurality of signals representative of the current value of each of said independent performance parameters $x_i$, means for supplying a third plurality of signals representative of each of said simulation coefficients $c_i$ and means for combining predetermined signals of said second and third plurality of signals to supply a signal representative of the current value of each estimate y of said monitored performance parameters; and, second signal processing means responsive to each of said signals representative of the current value of each estimate y of said monitored performance parameters and responsive to each of said signals supplied by said first sensor means for supplying a difference signal representative of the difference between the actual current value of each of said monitored performance parameters and the current estimated value of that same performance parameter.

2. The system of claim 1 further comprising:

selection means selectively operable for switching said system between a performance parameter monitoring mode and a calibration mode; and coefficient simulation means for supplying each of said scalar simulation coefficients $c_i$ when said selector means is operated to place said system in said calibration mode, said coefficient simulation means including digital filtering means responsive to each difference signal applied by said second signal processing means, said coefficient simulation means being periodically operable to repetitively actuate said digital filtering means and modify each of said simulation coefficients $c_i$ to decrease the difference between said actual value of each monitored performance parameter and said estimated value of that performance parameter with successive operations of said coefficient simulation means.

3. The system of claim 2 further comprising detection means for determining the accuracy of each estimated value of said monitored performance parameter during each periodic operation of said digital filtering means, said detection means including means for indicating that the accuracy of each of said estimated values of said monitored performance parameters is within a predetermined accuracy limit.

4. The system of claim 1 or claim 2 further comprising trending means for supplying a signal representative of the temporal characteristics of at least one of said monitored performance parameters, said trending means responsive to said difference signals supplied by said second signal processing means for estimating the value of a plurality of scalar trending coefficients $b_q$, $q=0, 1, \ldots, r$, where r and q are predetermined positive real numbers, said coefficients $b_q$ mathematically corresponding to the coefficients of a time dependent polynomial expression $$\sum_{q=0}^{r} b_q t^q$$

where to denotes the total time said system has operated to monitor each of said performance parameters.

5. The system of claim 4 further comprising steady state detector means responsive to at least one operating parameter of the gas turbine engine installation which includes the gas turbine engine being monitored, said steady state detector means including means for supplying a signal for interrupting the operation of said monitoring system during periods of time in which said gas turbine engine is not being operated in a steady state condition.

6. The system of claim 5 wherein said system monitors at least two engine performance parameters and said system further comprises logic means for logically combining the difference signals supplied by said second signal processing means for supplying a fault indication signal representative of a particular fault within said engine installation and said monitoring system, said system further comprising annunciator means responsive to said fault indication signal for supplying a humanly perceivable indication that said particular fault has occurred.

7. An airborne real time performance monitoring system for periodically monitoring a predetermined plurality of dependent performance parameters $y_k$, $k=1, 2, \ldots, n$ of a gas turbine engine of an aircraft gas turbine engine installation wherein the actual value of each monitored dependent performance parameter is compared with an associated estimated value $\hat{y}_k$, $K=1, 2, \ldots, n$ to supply a signal indicative of an operating fault in said gas turbine engine, each of said estimated values $\hat{y}_k$ being determined from a set of m independent performance parameters $x_i$, $i=1, 2, \ldots, m$ which are predetermined functions of elected engine installation operating parameters $s_j$, $j=1, 2, \ldots, p$ where said independent performance parameters $x_i$ collectively characterize the type of gas turbine engine being monitored, and a set of m scalar coefficients $c_i$, $i=1, 2, \ldots, m$ that characterize the particular gas turbine engine being monitored relative to other engines of the same type, m, n and p being predetermined positive real numbers, said gas turbine performance monitoring system comprising:

a plurality of sensor means for supplying signals representative of the value of each of said monitored dependent performance parameters $y_k$ and each of said engine installation operating parameters $s_j$ at each predetermined monitoring time KT where T is a predetermined system sampling interval and K is a positive real integer;

function generating means responsive to said signals supplied by said sensor means for determining the value of each of said independent performance parameters $x_i$ at each monitoring time KT;

digital processing means for determining the value of each of said estimated values $\hat{y}_k$ at each of said monitoring times KT, said digital processing means including means for setting the value of each $\hat{y}_k$ numerically equal to $$\sum_{i=1}^{m} x_i c_i;$$

comparator means for determining the difference between the values of each of said dependent performance parameters $y_k$ and the associated estimate $\hat{y}_k$ at each monitoring time KT, said comparator means including means for supplying a plurality of n difference signals representative of the difference between each of said monitored dependent performance parameters and its associated estimate $\hat{y}_k$; and logic means responsive to said difference signals supplied by said comparator means for logically combining said difference signals to supply a signal indicative of an operating fault within said gas turbine engine.

8. The performance monitoring system of claim 7 further comprising mode selector means operable for selectively operating said system in a performance parameter monitoring mode and for selectively operating said system in a calibration mode to automatically determine the values of said simulation coefficients $c_i$ which characterize said particular engine being monitored, said digital processor means further including digital filtering means for determining said values of said coefficients $c_i$, said digital filtering means including:

filter gain means for determining a plurality of m gain factors $g_i$, i=1, 2, . . . , m for each of said estimated values $\hat{y}_k$, k=1, 2, . . . , n at each of said monitoring times KT in which said systems is operated in said calibration mode, each of said gain factors being numerically equal to $G_{KT}=P_{K-1)T}X_{KT}(X'_{KT}P_{K-1)T}X_{KT}+R)^{-1}$ where G is an m element vector including said gain factors associated with said estimated values $\hat{y}_k$, X is an m element vector including each of said independent performance parameters $x_i$ that is associated with said particular estimated value $\hat{y}_k$, P is a matrix including m rows and m columns of scalar values, R is a predetermined scalar value representative of the system estimation error, the subscripts KT and (K−1)T respectively denote the values of the indicated parameters at the current monitoring time KT and at the nextmost antecedent monitoring time, and X' denotes the matrix transpose of the vector X;

error covariance means for modifying each of said scalar values of said P matrix to supply scalar values for use as the $P_{(K-1)T}$ matrix during the nextmost subsequent monitoring time of calibration mode, said modified values of said P matrix mathematically corresponding to $P_{KT}=P_{(K-1)(T}-G_{KT}X'_{KT}P_{(K-1)T}$; and, coefficient determination means for modifying each set of m simulation coefficients $c_i$, i=1, 2, . . . , m that is associated with each of said particular simulation values $y_k$, each set of said modified simulation coefficients mathematically corresponding to $C_{KT}=C_{(K-1)T}+G_{KT}(Y_{KT}-X'_{KT}C_{(K-1)T})$, where C is an m element vector including each of said simulation coefficients $c_i$ i=1, 2, . . . , m that are associated with said estimated value $\hat{y}_k$.

9. The performance monitoring system of claim 7 or claim 8 wherein said digital processing means further includes trend means for determining the temporal characteristics of each of said monitored dependent performance parameters $y_k$, k=1, 2, . . . , n, said trend means including means for determining a set of trend coefficients $b_q$, q=0, 1, . . . , r associated with each of said differences between the actual value of each of said dependent performance parameters $y_k$, K=1, 2, . . . , n and the estimated value $\hat{y}_k$ associated with said monitored dependent performance parameter at each monitoring time KT, each of said trend coefficients mathematically corresponding to the expression $$z_k = \sum_{q=0}^{r} b_q t^q$$

where $z_k$ represents the difference between one of said monitored dependent performance parameters $y_k$ and said associated estimate $\hat{y}_k$, t represents the total elapsed period of time over which said gas turbine engine has been monitored by said system and r is a predetermined positive read integer.

10. The performance monitoring system of claim 8 wherein said digital processing means includes trend means to adapt saiddigital filter means for determining the temporal characteristics of each of said monitored dependent performance parameters $y_k$, k=1, 2, . . . , n when said mode selector means is operated to cause said system to operate in said monitoring mode, said trend means including:

means for adapting said filter gain means for the determination of a plurality of gain factors $g_i$, i=0, 1, . . . , r for each difference $z_k$, k=1, 2, . . . , m between a monitored dependent performance parameter $y_k$ and the associated estimate $\hat{y}_k$ of that same performance parameter at each time KT in which said system is operated in said monitoring mode, each gain factor of said plurality of gain factors being numerically equal to $G_{KT}=P_{(K-1)T}X_{KT}[X'_{KT}P_{(K-1)T}X_{KT}+R]^{-1}$ where G is a vector including said gain factors associated with each such said difference $z_k$, X is a vector including elements $t^q$, q=0, 1, . . . , r, t being representative of the total time said system has operated in said monitoring mode, P is a matrix including r rows and r columns of scalar values;

means for adapting said error covariance means for modifying each of said scalar values of said P matrix to supply scalar values for use as the $P_{(K-1)T}$ matrix during the nextmost subsequent monitoring time of said monitoring mode, said modified values of said P matrix mathematically corresponding to $P_{KT}=P_{(K-1)T}-G_{KT}X'_{KT}P_{(K-1)T}$; and means for adapting said coefficient determination means for modifying each set of scalar coefficients $b_q$, q=0, 1, . . . , r that is associated with each said difference $z_k$, each set of modified scalar coefficients $b_q$ mathematically corresponding to $B_{KT}=B_{(K-1)T}+G_{KT}[Z_{KT}-X'_{KT}B_{(K-1)T}]$ where B denotes a vector including said set of scalar coefficients $b_q$, q=0, 1, . . . , r associated with said difference $z_k$.

11. In a gas turbine engine monitoring system of the type including parameter simulation means for estimating the current value of one or more critical engine performance parameters based on the current value of a plurality of operating parameters of the engine installation incorporating the monitored gas turbine engine and means for comparing each estimated current value of a critical performance parameter with the actual current value of that performance parameter to supply an indication of engine malfunction, the improvement comprising digital processing means for supplying the estimated current value of each of said critical performance parameters as scalar values mathematically equal to $$\sum_{i=1}^{m} c_i x_i$$

where $c_i$, i=1, 2, . . . , m is a set of predetermined scalar simulation coefficients that is associated with each of said performance parameters with said coefficients $c_i$ collectively characterizing the particular gas turbine engine being monitored relative to other gas turbine engines of the same type, m is a predetermined number and $x_i$, i=1, 2, . . . , m is a set of predetermined independent engine operating parameters that generically characterize the type of gas turbine engine being monitored, said independent performance parameters being selected from the set of real numbers and the current value of predetermined functions of selected ones of said parameters of said engine installation operating parameters; said digital processing means including:

means for storing n vectors $C_k$, k=1, 2, . . . , n, each vector $C_k$ having m scalar coefficient values $c_i$, i=1, 2, . . . , m, where n denotes the number of critical performance parameters monitored by said system;

means responsive to said current values of said plurality of engine installation operating parameters for determining the current value of each set of predetermined independent performance parameters $x_i$, i=1, 2, . . . , m;

means for multiplying each independent performance parameter $x_i$ by an associated scalar simulation coefficient $c_i$; and, means for accumulating the products of each of said multiplications to supply said estimated value of each of said critical performance parameter.

12. The gas turbine engine monitoring system of claim 11 wherein the improvement further comprises mode selection means for selectively operating said system in a monitoring mode to monitor said critical engine performance parameters and selectively operating said system in a calibration mode to automatically determine values of said scalar coefficients $c_i$ that minimize the error between said actual value of each said critical performance parameters and each said estimated current value of that critical performance parameter when said gas turbine engine is functioning normally, said digital processor means being responsive to said mode selector means and further including:

means for storing n sets of filter gain factors $G_k$, k=1, 2, . . . , n, each set of filter gain factors having m scalar values $g_i$, i=1, 2, . . . , m, each set of filter gain factors being uniquely associated with the difference between the current value of one of said monitored critical performance parameters and said estimated value of that same critical performance parameter;

means for storing n arrays $P_k$, k=1, 2, . . . , n each including m x m scalar values, each said array $P_k$ being uniquely associated with one of said difference between the actual current value of said monitored critical performance parameters and the estimated value of that same critical performance parameter;

means for determining the value of each of said filter gain factors $g_i$, i=1, 2, . . . , m for each of said differences between the current value of one of said monitored critical performance parameters and the estimated value of that same critical performance parameter, including means for establishing each set of filter gain factors $G_k$ to numerically correspond with the matrix expression $G_K=P_KX_K[X^T{}_KP_KX_K+R]^{-1}$ where X is a vector that includes the current value of each of said independent performance parameters, $P_K$ is a m by m matrix corresponding to said stored array $P_K$, R is a predetermined scalar value representative of the estimation accuracy of said monitoring system and the superscript T denotes the matrix transpose operation;

means for modifying the scalar values stored in said arrays $P_k$, k=1, 2, . . . , n including means for establishing each said array in accordance with the matrix expression $P_{k'}=P_k-G_KX^T{}_KP_k$ where the matrix $P_{k'}$ includes the modified scalar values and the matrix $P_k$ includes said scalar values prior to said modification; and means for modifying the scalar coefficients stored as each set $C_k$ of scalar coefficients $c_i$, including means for establishing each set of coefficients $C_k$ in accordance with the matrix expression $C_{k'}=C_k+G_k[y_i-X^T{}_kC_k]$ where $y_i$ denotes each particular one of the monitored critical performance parameters, the vector $C_{k'}$ includes the modified scalar coefficients associated with that monitored critical performance parameter, and the vector $C_k$ includes the scalar coefficient values prior to said modification.

13. The gas turbine engine monitoring system of claim 11 or claim 12 wherein the improvement further comprises trend means for determining the temporal characteristics of each of said monitored critical performance parameters, said trend means including means for determining a set of trend coefficients $b_q$, q=0, 1, . . . , r for each of said monitored critical performance parameters in accordance with the mathematical expression $$z_k = \sum_{q=0}^{r} b_q t^q$$

where $z_k$ denotes the difference between the current value of each particular value of one of said monitored critical performance parameters and said estimate of that critical performance parameter, t denotes the total time said monitoring system has been operative to monitor said critical performance parameter and r is a preselected positive real number; and, logic means responsive to said trend coefficients $b_q$, q=0, 1, . . . , r for each of said monitored critical performance parameters, said logic means including means for logically combining said trend coefficients to provide an indication of the future operative condition of said monitored gas turbine engine.

14. A method for monitoring the performance of a gas turbine engine comprising the steps of:

(a) detecting the current value of each gas turbine engine performance parameter being monitored;

(b) detecting the current values of a plurality of additional operating parameters of the gas turbine engine being monitored;

(c) generating a set of independent performance parameters $x_i$, i=1, 2, . . . , m for each of said monitored performance parameters, said independent performance parameters $x_i$ being functionally related to one or more of said detected additional operating parameters of the gas turbine engine being monitored, said independent performance parameters $x_i$ being selected to generically characterize the type of gas turbine engine being monitored;

(d) determining a current estimated value of each of said monitored performance parameters including the steps of determining the mathematical product of each independent performance parameter $x_i$, $i=1, 2, \ldots, m$ multiplied by an associated simulation coefficient $c_i$, $i=1, 2, \ldots, m$ and summing the products over the range $i=1$ to $i=m$, said simulation coefficients $c_i$ characterizing the particular gas turbine engine being monitored relative to other gas turbine engines of the same type;

(e) determining the difference between each of said monitored performance parameters and the estimated value of that same performance parameter; and (f) detecting said differences between each of said monitored performance parameters and the estimated value of that same performance parameter to provide an indication of the current condition of said gas turbine engine.

15. The gas turbine engine performance monitoring method of claim 14 further including a calibration step for initially determining scalar values of each of said simulation coefficients that characterize said particular gas turbine engine being monitored relative to other gas turbine engines of the same type, said calibration including the steps of:

(a) determining a plurality of filtered gain coefficients $g_i$, $i=1, 2, \ldots, m$ for each gas turbine engine performance parameter being monitored;

(b) determining the product of each of said differences between a monitored performance parameter and the estimated value of that performance parameter multiplied by each corresponding gain coefficient $g_i$;

(c) modifying the current value of each of said simulation coefficients $c_i$ by the value of said product determined in step b; and (d) repeating steps a, b and c until said difference between each of said monitored performance parameters and said estimated value of that performance parameter is less than a predetermined value.

16. The gas turbine performance monitoring method of claim 15 including the step of prognosticating the future performance of said gas turbine engine, said prognostication including the steps of:

(a) detecting the period of time t said system has been operative to monitor said gas turbine engine performance parameter;

(b) determining a set of scalar coefficients $b_q$, $q=0, 1, \ldots, r$ for each of said differences between a monitored performance parameter and the estimated value of that performance parameter in accordance with the mathematical expression $$z_i = \sum_{q=0}^{r} b_q t^q$$

where $z_i$ denotes one of said differences between a monitored performance parameter and the estimated value of that performance parameter and r is a preselected real positive number;

(c) repeating steps a and b each time said gas turbine engine performance parameter is monitored; and (d) logically combining said coefficients $b_q$, $q=0, 1, \ldots, r$ to indicate said future performance of said gas turbine engine.

* * * * *

UNITED STATES PATENT AND TRADEMARK OFFICE

CERTIFICATE OF CORRECTION

PATENT NO. : 4,215,412

DATED : July 29, 1980

INVENTOR(S) : Joseph L. Bernier et al.

It is certified that error appears in the above-identified patent and that said Letters Patent are hereby corrected as shown below:

Column 2, line 67: "a" is changed to --an--.

Column 7, line 42: "occurance" is changed to --occurrence--.

Column 7, line 46: "deterioation" is changed to --deterioration--.

Column 12, line 68: "permits" is changed to --permit--.

Column 13, line 7: "level", second occurrence, is deleted.

Column 13, line 47: "y hatj, j=1, n" is changed to --$\hat{y}_j$, j=1, . . ., n--.

Column 14, line 5: "annuciator" is changed to --annunciator--.

Column 14, line 42: "transist" is changed to --transit--.

Column 15, line 31: Equation (1-A) is changed to $$--\hat{C}_K = \hat{C}_{K-1} + G_K [y_K - X_K^T \hat{C}_{K-1}]--$$

Column 15: Equation (1-B) is changed to $$--G_K = P_{K-1} X_K [X_K^T P_{K-1} X_K + R]^{-1}--$$

Column 15: Equation (1-C) is changed to $$--P_K = P_{K-1} - G_K X_K^T P_{K-1}--$$

UNITED STATES PATENT AND TRADEMARK OFFICE
CERTIFICATE OF CORRECTION

PATENT NO. : 4,215,412

DATED : July 29, 1980

INVENTOR(S) : Joseph L. Bernier et al.

It is certified that error appears in the above-identified patent and that said Letters Patent are hereby corrected as shown below:

Column 15, line 49: the equation is changed to --$[y_K - X_K^T \hat{C}_{K-1}]$--.

Column 16, line 12: the equation is changed to --$z_K = y_K - X_K^T \hat{C}_{K-1}$--.

Column 21, line 13: "y hat$_k$," is changed to --$\hat{y}_k$,--.

Column 21, lines 22 and 23: "y hat = $c_1x_1 + c_2s_2$" is changed to --$\hat{y} = c_1x_1 + c_2s_2$--.

Column 22, line 4: the equation is changed to --$X_K^T P_{K-1}$--.

Column 22, line 15: the equation is changed to --$X_K^T P_{K-1} X_K$--.

Column 22, line 17: the equation is changed to --$(X_K^T P_{K-1} X_K + R)^{-1}$--.

Column 22, line 36: "scaler" is changed to --scalar--.

Column 22, line 56: "c hat$_2$(K-1) is changed to --$\hat{c}_2(K-1)$--.

Column 22, line 59: the equation is changed to --$X_K^T \hat{C}_{K-1}$--.

Column 23, line 64: the equation is changed to --$y_k - X_K^T C_{k-1}$--.

Column 25, line 45: "both", second occurrence is deleted.

Column 31, line 25: the equation is changed to $$-- \sum_{i=1}^{m} \hat{c}_i(k-1)\, x_i(k) --$$

UNITED STATES PATENT AND TRADEMARK OFFICE
CERTIFICATE OF CORRECTION

PATENT NO. : 4,215,412

DATED : July 29, 1980

INVENTOR(S) : Joseph L. Bernier et al.

It is certified that error appears in the above-identified patent and that said Letters Patent are hereby corrected as shown below:

Column 31, line 33: the equation is changed to $$-- \Sigma_{q=0}^{r} b^{q}(k-1)\, T^{q}(k) --$$

Column 31, line 63: the equation is changed to $--X_K^T P_{K-1}--$.

Column 32, line 11: the equation is changed to $--[X_K^T P_{K-1} X_K + R]^{-1}--$.

Column 32, line 52: "operting" is changed to --operating--.

Column 34, line 33: "he" is changed to --the--.

Column 37, lines 26 and 27: "correspond" is changed to --corresponds--.

Column 38, line 41: "scaler" is changed to --scalar--.

Column 39, line 18: "scaler" is changed to --scalar--.

Column 40, line 18: the equation is changed to $--G_K X_K^T P_{K-1}--$.

Column 40, line 39: "scaler" is changed to --scalar--.

Column 40, line 45: "scaler" is changed to --scalar--.

UNITED STATES PATENT AND TRADEMARK OFFICE

CERTIFICATE OF CORRECTION

PATENT NO. : 4,215,412

DATED : July 29, 1980

INVENTOR(S) : Joseph L. Bernier et al.

It is certified that error appears in the above-identified patent and that said Letters Patent are hereby corrected as shown below:

Column 41, line 21: "scaler" is changed to --scalar--.

Column 49, line 36: "applied" is changed to --supplied--.

Column 50, line 29: "K=1" is changed to --k=1--.

Column 50, line 35: "elected" is changed to --selected--.

Column 51, line 23: "systems" is changed to --system--.

Column 51, line 26: the equation is changed to $$--G_{KT} = P_{(K-1)T}X_{KT}(X'_{KT}P_{(K-1)T}X_{KT} + R)^{-1}--$$

Column 51, line 46: the equation is changed to $$P_{KT} = P_{(K-1)T} - G_{KT}X'_{KT}P_{(K-1)T}--$$

Column 51, line 64: "K=1" is changed to --k=1--.

Column 52, line 10: "read" is changed to --real--.

UNITED STATES PATENT AND TRADEMARK OFFICE

CERTIFICATE OF CORRECTION

PATENT NO. : 4,215,412
DATED : July 29, 1980
INVENTOR(S) : Joseph L. Bernier et al.

It is certified that error appears in the above-identified patent and that said Letters Patent are hereby corrected as shown below:

Column 52, line 13: "saiddigital" is changed to --said digital--.

Column 53, line 67: the equation is changed to $$--G_K = P_K X_K [X_K^T P_K X_K + R]^{-1}--$$

Column 54, line 10: the equation is changed to $--P_{k'} = P_k - G_K X_K^T P_k--$.

Column 54, line 18: the equation is changed to $--C_{k'} = C_k + G_k[y_i - X_k^T C_k]--$.

Signed and Sealed this

*Seventeenth* Day of *March 1981*

[SEAL]

*Attest:*

RENE D. TEGTMEYER

*Attesting Officer* *Acting Commissioner of Patents and Trademarks*